US012665777B2

(12) United States Patent (10) Patent No.: US 12,665,777 B2
Liu et al. (45) Date of Patent: Jun. 23, 2026

(54) BLOCKCHAIN-BASED DATA PROCESSING METHOD AND APPARATUS, DEVICE, MEDIUM, AND PRODUCT

(71) Applicant: Tencent Technology (Shenzhen) Company Limited, Shenzhen (CN)

(72) Inventors: Qucheng Liu, Shenzhen (CN); Zongyou Wang, Shenzhen (CN); Jinsong Zhang, Shenzhen (CN); Gengliang Zhu, Shenzhen (CN); Yifang Shi, Shenzhen (CN); Hanqing Liu, Shenzhen (CN); Yingjie Guo, Shenzhen (CN); Zhiyong Liao, Shenzhen (CN); Hu Lan, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 110 days.

(21) Appl. No.: 18/503,914

(22) Filed: Nov. 7, 2023

(65) Prior Publication Data

US 2024/0073045 A1 Feb. 29, 2024

Related U.S. Application Data

(63) Continuation of application No. PCT/CN2022/134549, filed on Nov. 28, 2022.

(30) Foreign Application Priority Data

Mar. 7, 2022 (CN) .......................... 202210228135.8

(51) Int. Cl.
*H04L 9/00* (2022.01)
*H04L 9/32* (2006.01)

(52) U.S. Cl.
CPC .............. *H04L 9/50* (2022.05); *H04L 9/3247* (2013.01)

(58) Field of Classification Search
CPC ... H04L 63/12; H04L 67/1097; H04L 9/3247; H04L 9/50; H04L 63/00; H04L 63/123; H04L 67/104; H04L 9/3263; H04L 9/3265
See application file for complete search history.

(56) References Cited

U.S. PATENT DOCUMENTS

| | | | | |
|---|---|---|---|---|
| 2020/0005255 A1* | 1/2020 | Wu | .......................... | G06F 21/64 |
| 2021/0105281 A1* | 4/2021 | Shin | .................... | G06F 16/2255 |
| 2022/0004536 A1* | 1/2022 | Liao | ........................ | G06F 21/64 |

FOREIGN PATENT DOCUMENTS

| | | |
|---|---|---|
| CN | 108427601 A | 8/2018 |
| CN | 110457942 A | 11/2019 |

(Continued)

OTHER PUBLICATIONS

International Search Report issued Feb. 13, 2023 in International (PCT) Application No. PCT/CN2022/134549 with English translation (9 pages).

(Continued)

*Primary Examiner* — Olugbenga O Idowu
(74) *Attorney, Agent, or Firm* — Crowell & Moring LLP

(57) ABSTRACT

A blockchain-based data processing method, apparatus, and computer-readable medium are provided. Block proposal information is received including a block and a digital signature transmitted by an out-block node. The digital signature is obtained by performing digital signature processing on block header information included in the block. The block header information includes a first Merkel root determined based on transaction data in the block body information. Digest calculation on the block header information is performed to obtain first digest information. De- (Continued)

signature processing is performed on the digital signature to obtain second digest information. A second Merkel root is determined based on the transaction data acquired from the block proposal information when the first digest information and the second digest information are matched. An operation on the block is performed based on a comparison result of the first Merkel root and the second Merkel root.

20 Claims, 8 Drawing Sheets

(56)                    References Cited

FOREIGN PATENT DOCUMENTS

| CN | 111159297 A | 5/2020 |
| KR | 101924026 B1 | 11/2018 |
| WO | WO 2018/119930 A1 | 7/2018 |
| WO | WO 2021/135757 A1 | 7/2021 |
| WO | WO 2021/220062 A1 | 11/2021 |

OTHER PUBLICATIONS

Chinese-language Office Action issued in Chinese Application No. 202210228135.8 dated Jan. 19, 2026 with partial English translation (19 pages).

* cited by examiner

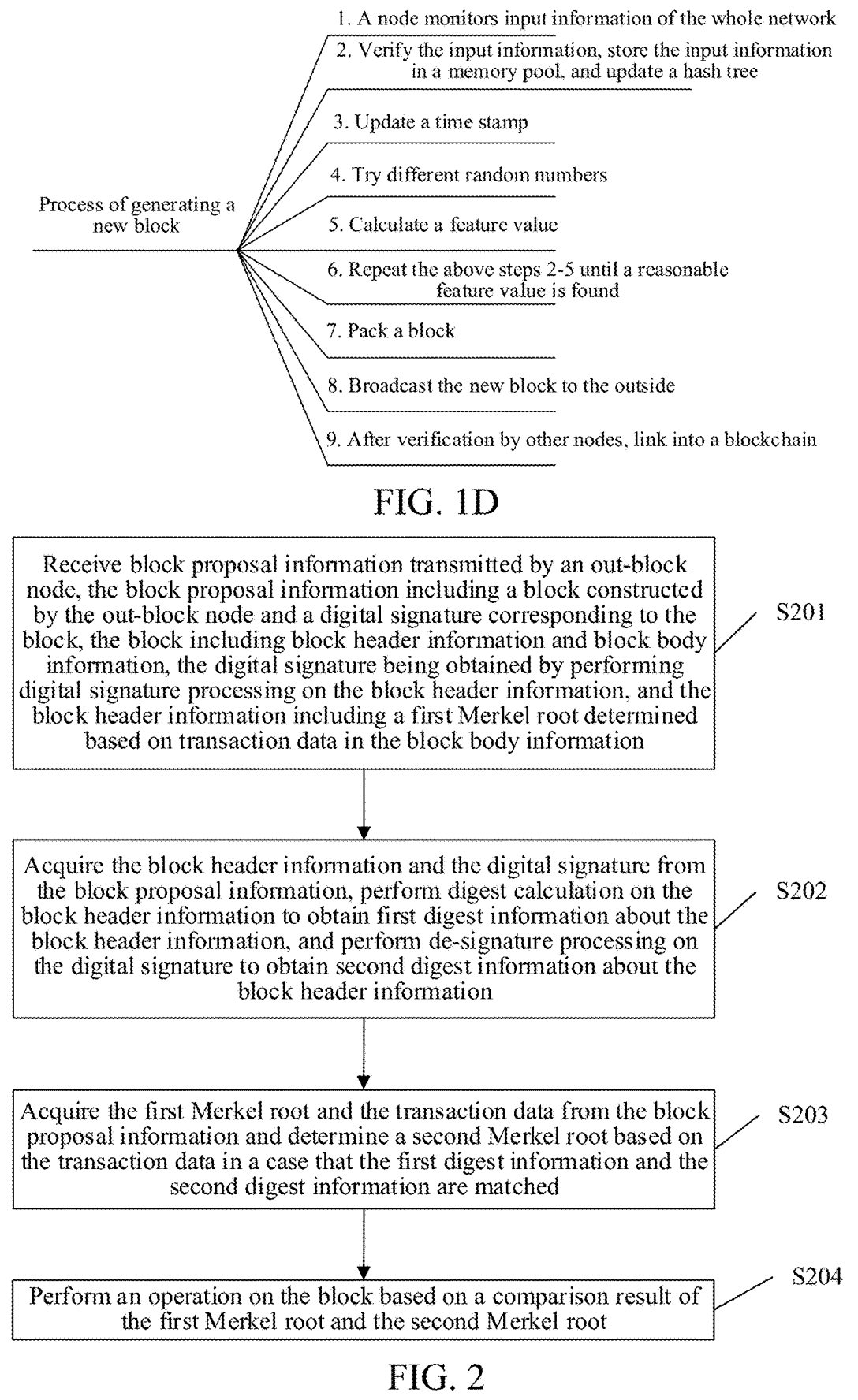

1. A node monitors input information of the whole network

2. Verify the input information, store the input information in a memory pool, and update a hash tree 3. Update a time stamp 4. Try different random numbers Process of generating a new block 5. Calculate a feature value 6. Repeat the above steps 2-5 until a reasonable feature value is found 7. Pack a block 8. Broadcast the new block to the outside 9. After verification by other nodes, link into a blockchain

FIG. 1D

Receive block proposal information transmitted by an out-block node, the block proposal information including a block constructed by the out-block node and a digital signature corresponding to the block, the block including block header information and block body information, the digital signature being obtained by performing digital signature processing on the block header information, and the block header information including a first Merkel root determined based on transaction data in the block body information ⟋ S201

Acquire the block header information and the digital signature from the block proposal information, perform digest calculation on the block header information to obtain first digest information about the block header information, and perform de-signature processing on the digital signature to obtain second digest information about the block header information ⟋ S202

Acquire the first Merkel root and the transaction data from the block proposal information and determine a second Merkel root based on the transaction data in a case that the first digest information and the second digest information are matched ⟋ S203

Perform an operation on the block based on a comparison result of the first Merkel root and the second Merkel root ⟋ S204

FIG. 2

Create a block, the block including block header information and block body information, the block body information including transaction data, and the block header information including a first Merkel root determined based on the transaction data ⟋ S401

Perform digital signature processing on the block header information to obtain a digital signature and generate block proposal information based on the block and the digital signature ⟋ S402

Transmit the block proposal information to the consensus node in the blockchain network to enable the consensus node in the blockchain network to verify data included in the block proposal information and perform the operation on the block based on the verification result ⟋ S403

FIG. 4

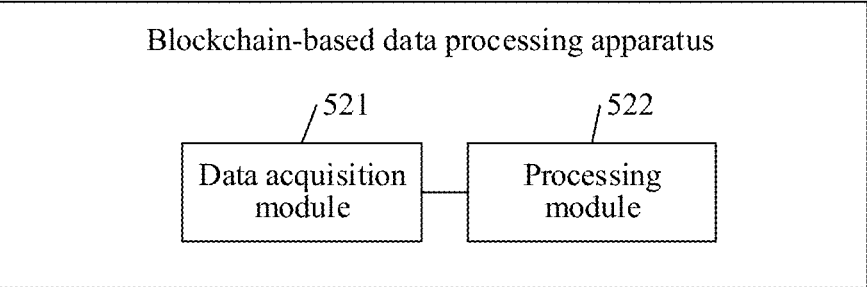

Blockchain-based data processing apparatus

⟋501          ⟋502

| Data acquisition module | | Processing module |

FIG. 5A

Blockchain-based data processing apparatus

⟋521          ⟋522

| Data acquisition module | | Processing module |

FIG. 5B

BLOCKCHAIN-BASED DATA PROCESSING METHOD AND APPARATUS, DEVICE, MEDIUM, AND PRODUCT

RELATED APPLICATION

This application is a continuation of PCT PCT/CN2022/134549 filed Nov. 28, 2022, which claims priority to Chinese Patent Application No. 202210228135.8, entitled "BLOCKCHAIN-BASED DATA PROCESSING METHOD AND APPARATUS, DEVICE, MEDIUM, AND PRODUCT", filed to China National Intellectual Property Administration on Mar. 7, 2022. All are incorporated by reference in their entireties.

FIELD OF THE TECHNOLOGY

The present subject matter relates to the technical field of a blockchain, and in particular, to a blockchain-based data processing method, a blockchain-based data processing apparatus, a data processing device, a non-transitory computer-readable storage medium, and a computer program product.

BACKGROUND OF THE DISCLOSURE

With the continuous growth and application of the computer technology, the blockchain technology has advanced rapidly. Because the information stored in the blockchain cannot be forged and tampered, it has become the current trend to use the blockchain technology for service data processing. When block synchronization is performed, an out-block node creates a block, generates block proposal information based on the created block, and broadcasts same to a consensus node. The consensus node may perform processing, such as block consensus, based on the received block proposal information. However, abnormal situations, such as data loss, may occur in the process of transmitting the block proposal information, and the consensus node cannot verify the data of the block proposal information. Therefore, errors appear in the block proposal information received by the consensus node. Then, the consensus node processes based on the erroneous block proposal information, resulting in abnormal processing results. Therefore, it is an urgent problem to be solved to realize data verification of the block proposal information so as to ensure the accuracy of the processing results after processing based on the block proposal information.

BRIEF SUMMARY

The examples of the present subject matter provide a blockchain-based data processing method and apparatus, a device, a medium, and a product. The efficiency of generating a proposal by an out-block node and processing a proposal by a consensus node can be improved while ensuring the accuracy of block proposal information.

The examples of the present subject matter provide a blockchain-based data processing method, performed by a consensus node device in a blockchain network, the method including:

receiving block proposal information transmitted by an out-block node, the block proposal information including a block constructed by the out-block node and a digital signature corresponding to the block, the block including block header information and block body information, the digital signature is obtained by per-forming digital signature processing on the block header information, and the block header information including a first Merkel root determined based on transaction data in the block body information;

acquiring the block header information and the digital signature from the block proposal information, performing digest calculation on the block header information to obtain first digest information about the block header information, and performing de-signature processing on the digital signature to obtain second digest information about the block header information;

acquiring the first Merkel root and the transaction data from the block proposal information and determining a second Merkel root based on the transaction data when the first digest information and the second digest information are matched; and performing an operation on the block based on a comparison result of the first Merkel root and the second Merkel root.

The examples of the present subject matter provide another blockchain-based data processing method, performed by an out-block node device in a blockchain network, the method including:

creating a block, the block including block header information and block body information, the block body information including transaction data, and the block header information including a first Merkel root determined based on the transaction data;

performing digital signature processing on the block header information to obtain a digital signature and generating block proposal information based on the block and the digital signature; and transmitting the block proposal information to each consensus node in the blockchain network, each consensus node in the blockchain network acquiring the block header information and the digital signature from the block proposal information, performing digest calculation on the block header information to obtain first digest information about the block header information and performing de-signature processing on the digital signature to obtain second digest information about the block header information, acquiring the first Merkel root and the transaction data from the block proposal information and determining a second Merkel root based on the transaction data when the first digest information and the second digest information are matched, and performing an operation on the block based on a comparison result of the first Merkel root and the second Merkel root.

The examples of the present subject matter provide a blockchain-based data processing apparatus, including:

a data acquisition module, configured to receive block proposal information transmitted by an out-block node, the block proposal information including a block constructed by the out-block node and a digital signature corresponding to the block, the block including block header information and block body information, the digital signature is obtained by performing digital signature processing on the block header information, and the block header information including a first Merkel root determined based on transaction data in the block body information; and a processing module, configured to acquire the block header information and the digital signature from the block proposal information, perform digest calculation on the block header information to obtain first digest information about the block header information and perform de-signature processing on the digital signature to obtain second digest information about the block header information, the processing module is further configured to acquire the first Merkel root and the transaction data from the block proposal information and determine a second Merkel root based on the transaction data when the first digest information and the second digest information are matched, and the processing module is further configured to perform an operation on the block based on a comparison result of the first Merkel root and the second Merkel root.

The examples of the present subject matter provide another blockchain-based data processing apparatus, including:

a data acquisition module, configured to create a block, the block including block header information and block body information, the block body information including transaction data, and the block header information including a first Merkel root determined based on the transaction data; and a processing module, configured to perform digital signature processing on the block header information to obtain a digital signature and generate block proposal information based on the block and the digital signature, and the processing module is further configured to transmit the block proposal information to each consensus node in the blockchain network, each consensus node in the blockchain network acquiring the block header information and the digital signature from the block proposal information, performing digest calculation on the block header information to obtain first digest information about the block header information and performing de-signature processing on the digital signature to obtain second digest information about the block header information, acquiring the first Merkel root and the transaction data from the block proposal information and determining a second Merkel root based on the transaction data when the first digest information and the second digest information are matched, and performing an operation on the block based on a comparison result of the first Merkel root and the second Merkel root.

The examples of the present subject matter provide a data processing device, including a processor, a memory, and a network interface connected to each other, the memory is configured to store a computer program including a program instruction, and the processor is configured to call the program instruction to implement the steps of the above blockchain-based data processing methods.

The examples of the present subject matter provide a non-transitory computer-readable storage medium, storing a computer program, the computer program including a program instruction which, when executed by a processor, implements the steps of the above blockchain-based data processing methods.

The examples of the present subject matter provide a computer program product, including a computer program or a computer instruction which, when executed by a processor, implements the steps of the above blockchain-based data processing methods.

BRIEF DESCRIPTION OF THE DRAWINGS

In order to illustrate the technical solutions in the examples of the present subject matter more clearly, the drawings that need to be used in the description of the examples will be briefly described below. It is apparent that other drawings can be obtained by those skilled in the art according to the drawings without creative work.

FIG. 1D is a schematic diagram of a process for generating a new block provided in an example of the present subject matter.

FIG. 2 is a flowchart of a blockchain-based data processing method provided in an example of the present subject matter.

FIG. 4 is a flowchart of another blockchain-based data processing method provided in an example of the present subject matter.

FIG. 5A to FIG. 5B are schematic block diagrams of blockchain-based data processing apparatuses provided in the examples of the present subject matter.

DETAILED DESCRIPTION

Figure 1A:
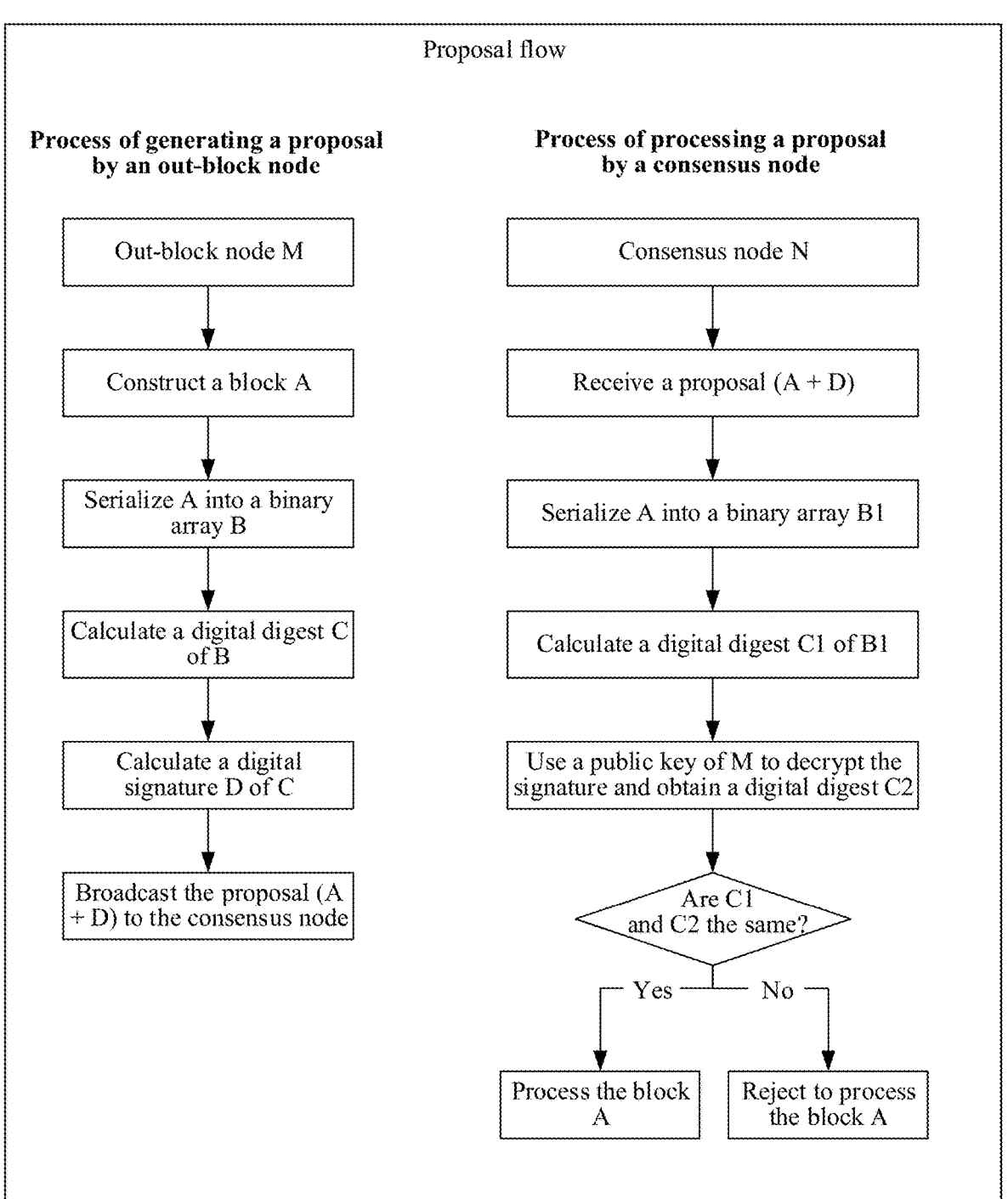
FIG. 1A is a flowchart of a blockchain-based proposal provided in an example of the present subject matter.

In conjunction with the drawings in the examples of the present subject matter, the technical solutions of the examples of the present subject matter will be clearly and completely described below. It is apparent that the examples described are only some, but not all examples of the present subject matter. Other examples can be obtained by those skilled in the art based on the examples of the present subject matter without creative work, which fall within the scope of protection of the present subject matter.

The terms "first" and "second" involved in the examples of the present subject matter are merely used for describing the objectives and are not understood as indicating or implying the relative importance, or implicitly indicating the number of indicated technical features. Thus, technical features defined with the "first" or "second" may explicitly or implicitly include at least one of the features.

Some key terms that appear in the examples of the present subject matter are described below.

In a blockchain, a block is divided into two major parts, namely a block header and a block body. The block header stores header information about a block, such as a pre-hash of a previous block, a hash of the present block body, and a time stamp. The block body stores the block's data, and the data includes several lines of records, which may be transaction information or some other kinds of information. An out-block node in the blockchain packs the block body information and the signature information thereof into a network message and broadcasts same to other nodes. This message is referred to as a proposal, and the proposal is a common message type in the blockchain. In an example of the present subject matter, the out-block node is a node responsible for packing a transaction and generating a block.

Digital signature, also referred to as public key digital signature, is a piece of digit string which can be generated only by the information transmitter and cannot be forged by other objects. This piece of digit string is also a valid proof of the authenticity of the information transmitted by the information transmitter. The digital signature is a common physical signature like those written on paper, but it is implemented using technologies in the field of public key encryption. It is a method for authenticating digital information. A set of digital signatures generally defines two complementary operations. One is for signing, and the other is for verification. The digital signature is application of an asymmetric key encryption technology and a digital digest technology.

Consortium blockchain is a systematic form between public chain and private chain and is often controlled by a plurality of centers. Several organizations work together to maintain a blockchain. The use of the blockchain is limited access with permissions. The relevant information will be protected, such as a supply chain institution or a banking union. The consortium blockchain may be viewed as a distributed managed billing system that is controlled by a number of "authoritative" nodes designated by an organization. These nodes manage and operate the entire system in accordance with a consensus mechanism. The consortium blockchain may be viewed as "partially decentralized". The public can access it and trade, but it needs to be approved by the consortium for trade verification or smart contract issuance. A typical feature of the consortium blockchain is that each node usually has a corresponding physical institution and can join or leave the system only after being approved by the consortium. Benefit-related organizations cooperate closely on the blockchain and work together to maintain healthy and stable growth of the system. In the consortium blockchain, nodes have a certain admission mechanism, and message communication between the nodes also needs to carry identity information (e.g. a digital signature). After confirming that it is information transmitted by a valid node of the consortium blockchain (namely, a signing verification process), the information can be accepted and processed by other nodes. The present subject matter will describe the methods of the following examples taking the consortium blockchain as an example.

The example of the present subject matter firstly provides a blockchain proposal method. With reference to FIG. 1A, a flow of the blockchain proposal includes two parts: generating a proposal by an out-block node and processing a proposal by a consensus node.

In the process of generating a proposal by an out-block node, the out-block node M first constructs a block A; serializes the block A into a binary array B; then performs digest calculation on the binary array B to obtain a digital digest C; signs the digital digest C to obtain a digital signature D; finally packs the block A and the digital signature D into a proposal (A+D) and broadcasts same to a consensus node. The consensus node is responsible for consensus voting and block validation.

In the process of processing a proposal by a consensus node, the consensus node N first receives the proposal (A+D) broadcasted by the out-block node; extracts the block A in the proposal (A+D) and serializes the block A in the proposal into a binary array B1; then performs digest calculation on the binary array B1 to obtain a digital digest C1; uses a public key of the out-block node to decrypt the digital signature D to obtain a digital digest C2; finally compares the digital digest C1 with the digital digest C2, processes the block A if C1 is equal to C2, and rejects to process the block A if C1 is not equal to C2.

By the above method, the blockchain proposal may be realized. The out-block node constructs a digital signature based on block header information and block body information in a block, packs the block and the digital signature into a proposal, and transmits same to the consensus node. The consensus node receives the block and the digital signature, generates a digital digest by the block header information and the block body information in the block, and decrypts the received digital signature to generate another digital digest. By comparing the two summaries, the consensus node may verify the authenticity and integrity of the received proposal. However, when a block is large (i.e. the load of a blockchain is high), the data volume in a single block will be large. As such, the whole proposal will take a long time because constructing a digital signature requires to serialize a large transaction list (i.e. block body information), and this process will take a long time and reduce the performance of the whole chain. The example of the present subject matter uses the characteristics of a blockchain data structure to directly construct a digital signature by the block header information, so that the data volume involved in constructing the digital signature is greatly reduced. In addition, the received transaction data is used to construct a second Merkel root, and transaction data verification is performed with a first Merkel root generated in the block header based on the transaction data thereof. In this way, the reliability of the information is ensured, and the efficiency of the proposal is improved.

The present subject matter will be illustrated by the following examples.

Figure 1B:
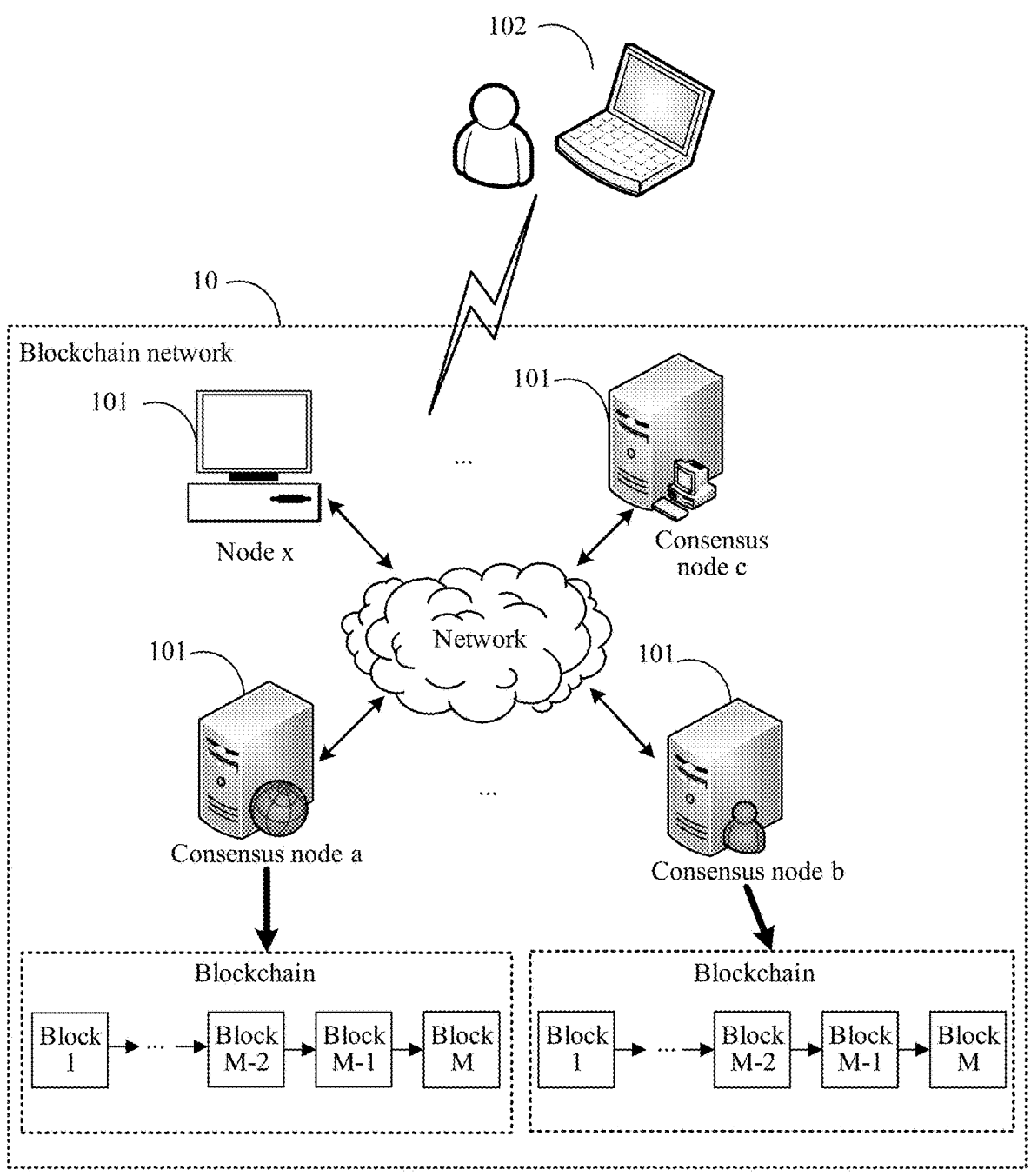
FIG. 1B is a schematic diagram of an architecture of a blockchain-based data processing system provided in an example of the present subject matter.

With reference to FIG. 1B, a schematic diagram of an architecture of a blockchain-based data processing system provided in an example of the present subject matter is shown. The blockchain-based data processing system includes a blockchain network 10 and a client 102.

The blockchain network 10 refers to a network for performing data sharing between nodes, and the blockchain network may include a plurality of nodes 101. The plurality of nodes 101 may include consensus nodes. Each node 101 may receive input information during normal operation and maintain shared data (i.e. a blockchain) within the blockchain network based on the received input information. Each node in the blockchain network stores the same blockchain, and the blockchain includes a series of blocks successively following each other according to the generated chronological order, such as the block 1, block M−1, and the like shown in FIG. 1B. Once a new block is added into the blockchain, the new block will not be removed. The record data submitted by the nodes in the blockchain network is recorded in the block. In order to ensure information intercommunication in the blockchain network, an information connection may exist between each node, and peer to peer (P2P) communication may be realized between any two nodes. In particular, P2P communication may be performed via a wired communication link or a wireless communication link. For example, when any node in the blockchain network receives the input information, other nodes acquire the input information according to a consensus algorithm and store the input information as data in shared data, so that the data stored on all the nodes in the blockchain network are consistent.

The client 102 may access the blockchain network and may communicate with the nodes in the blockchain network, e.g. transmit the transaction data and the like to the nodes. The terminal where the client 102 is located may specifically be a smart phone, a tablet computer, a notebook computer, a desktop computer, a vehicle-mounted intelligent terminal, and the like, which is not limited in the examples of the present subject matter.

The number of the nodes shown in FIG. 1B is merely illustrative. Any number of nodes may be deployed according to actual needs. The node may refer to any form of computing device in an access network, for example, a server and a user terminal may join to be a node.

For each node in the blockchain network, it has its corresponding node identification. In addition, each node in the blockchain network can store the node identifications of other nodes in the blockchain network to subsequently broadcast the generated block to other nodes in the blockchain network based on the node identifications of other nodes. Each node may maintain a node identification list as shown in the following table, and the node name and the node identification are correspondingly stored in the node identification list. The node identification may be an Internet protocol (IP) address and any other information which can be used for identifying the node, and the Table only takes the IP address as an example for explanation.

| Node name | Node identification |
| --- | --- |
| Node 1 | 117.114.151.174 |
| Node 2 | 117.116.189.145 |
| . . . | . . . |
| Node N | 119.123.789.258 |

Figure 1C:
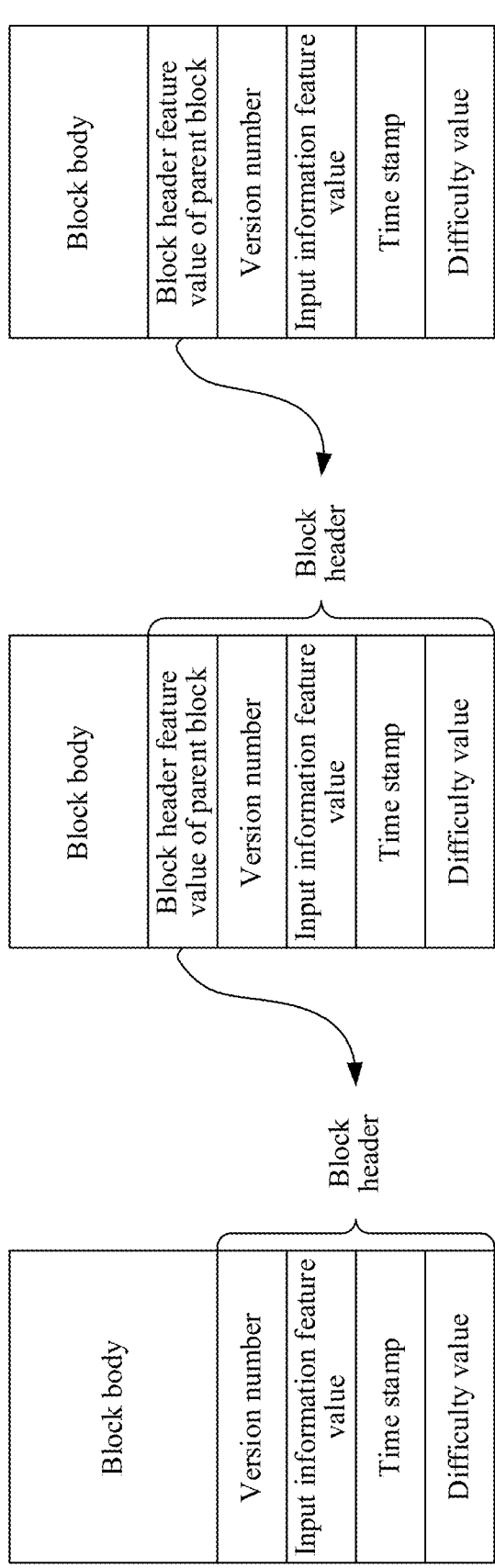
FIG. 1C is a schematic structural diagram of a blockchain provided in an example of the present subject matter.

Each node in the blockchain network stores the same blockchain. A blockchain is composed of a plurality of blocks. With reference to FIG. 1C, the blockchain is composed of a plurality of blocks, and a starting block of the block includes a block header and a block body. An input information feature value, a version number, a time stamp, and a difficulty value are stored in the block header, and the input information is stored in the block body. The next block of the starting block takes the starting block as a parent block, and the next block also includes a block header and a block body. The block header stores an input information feature value of the current block, a block header feature value of the parent block, a version number, a time stamp, and a difficulty value. It can deduce the rest from this so that the block data stored in each block in the blockchain is associated with the block data stored in the parent block, ensuring the security of the input information in the block.

When various blocks in the blockchain are generated, with reference to FIG. 1D, when receiving the input information, a node where the blockchain is located verifies the input information, stores the input information in a memory pool after the verification, and updates a hash tree used for recording the input information. Then, the node updates the update time stamp to the time when the input information is received and tries different random numbers to perform feature value calculation multiple times. As such, the calculated feature value can satisfy the following formula:

$$SHA256(SHA256(version+prev\_hash+merkle\_root+ntime+nbits+x))<TARGET$$

SHA256 is a feature value algorithm for calculating a feature value; version (version number) is the version information of relevant block protocols in the blockchain; prev_hash is a block header feature value of a parent block of the current block; merkle_root is the feature value of the input information; ntime is the update time of the update time stamp; nbits is the current difficulty, is a fixed value for a period of time, and is determined again after exceeding a fixed period of time; x is a random number; TARGET is the feature value threshold value, which can be determined according to nbits.

As such, when a random number satisfying the above formula is calculated, information can be correspondingly stored to generate a block header and a block body so as to obtain a current block. Subsequently, the node where the blockchain is located separately transmits the newly generated block to other nodes in the blockchain network where it is located based on the node identifications of other nodes in the blockchain network. Other nodes verify the newly generated block and add the newly generated block to the blockchain stored therein after the verification.

A smart contract may be run on a node of a blockchain network, and various transactions may be realized by calling the smart contract. The smart contract is an untampered and automatically executed computer program run on the blockchain. The smart contract is a code implementation used for executing when certain conditions are satisfied. A developer may define a contract logic by a programming language, issue same to the blockchain (smart contract registration), and call a key or other event trigger execution to complete the contract logic while providing the functions of upgrading and revoking the smart contract according to the logic of contract terms.

In some possible implementations, any node 101 of the blockchain network may acquire transaction data of the client. The transaction data may carry an identity identification of the client, and the identity identification may be determined according to an identity certificate of the client. The node 101 may query the identity certificate of the client from a smart contract according to the identity identification. If the identity certificate of the client is queried from the smart contract, and it is determined according to the identity certificate that the client has a permission to perform a transaction operation corresponding to the transaction data of the blockchain, then the node 101 may execute a transaction operation corresponding to the transaction data for the blockchain, determine the identity certificate corresponding to the client using the mapping relationship between the identity identification carried by the transaction data and the identity certificate recorded in the smart contract, and perform a transaction operation according to the permission indicated in the identity certificate so as to improve the security of data processing on the blockchain. Only the identity identification is carried in the transaction data. The data volume of the transaction data may be reduced with respect to carrying a complete identity certificate in the transaction data when the respective identity certificate may be ensured to be acquired, which is beneficial to the rapid transmission of the transaction data.

Generally, it is also necessary to generate a transaction block for the transaction data and perform uplink on the block (storing the block on a blockchain). Since only the identity identification is carried, the data volume of the transaction data may be reduced with respect to carrying a complete identity certificate in the transaction data when the respective identity certificate may be ensured to be acquired so as to realize data compression to a certain extent, and thus the consumption of storage resources of the blockchain can be reduced.

It can be understood that, the specific implementations of the present subject matter relate to the relevant data, including blockchain status data, transaction data, and user information. When the above examples of the present subject matter apply the above data to a specific product or technology, it is necessary to obtain the user's permission or consent, and the collection, use and processing of the relevant data need to comply with the relevant laws, regulations and standards of the relevant countries and regions.

The implementation details of the technical solutions of the examples of the present subject matter are described in detail below.

Reference will be made to FIG. 2, and FIG. 2 shows a flowchart of a blockchain-based data processing method provided in an example of the present subject matter. The data processing method in an example of the present subject matter is described on the consensus node side. As shown in FIG. 2, the blockchain-based data processing method may include the following steps.

S201: Receive block proposal information transmitted by an out-block node, the block proposal information including a block constructed by the out-block node and a digital signature corresponding to the block, the block including block header information and block body information, the digital signature is obtained by performing digital signature processing on the block header information, and the block header information including a first Merkel root determined based on transaction data in the block body information.

Figure 3A:
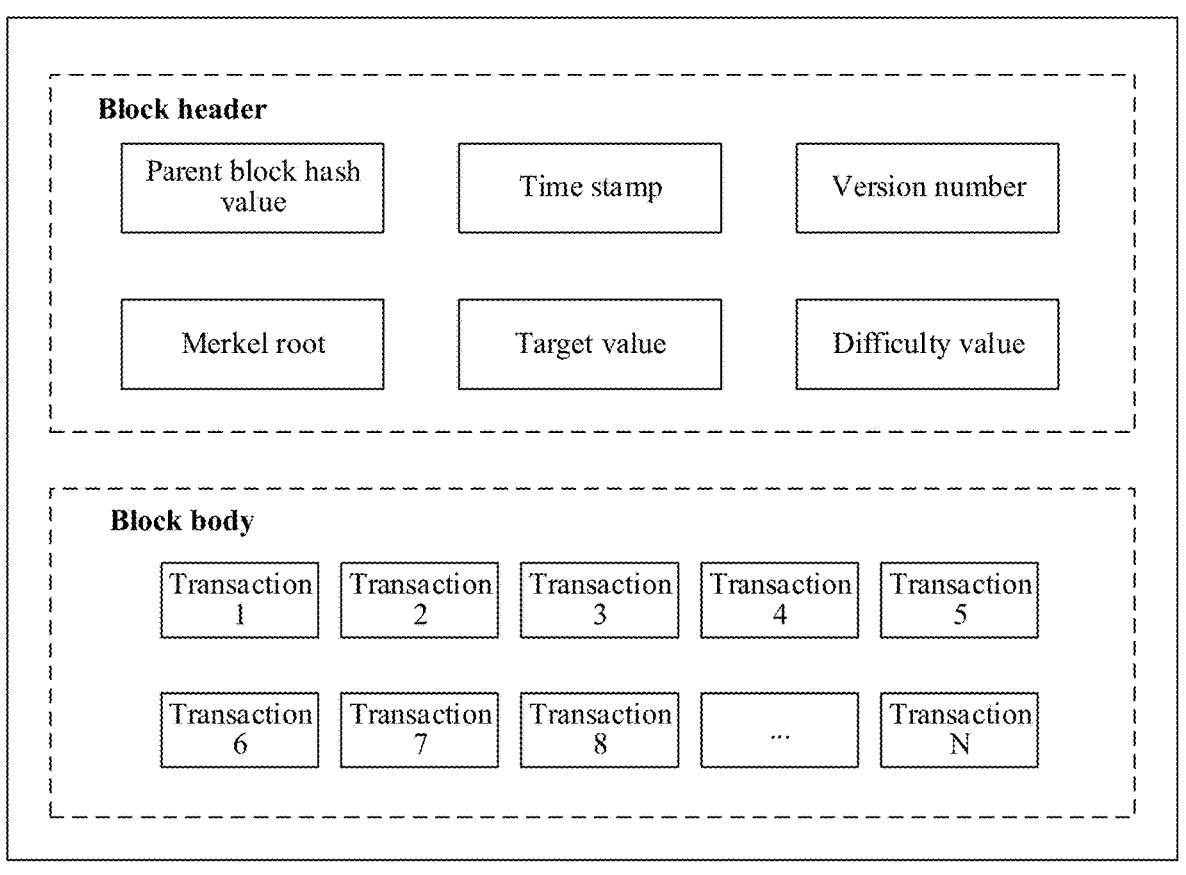
FIG. 3A is a schematic structural diagram of a block in a blockchain provided in an example of the present subject matter.

Firstly, the structure of the block is introduced (namely, a block constructed by the out-block node). With reference to FIG. 3A, FIG. 3A is a schematic structural diagram of a block in a blockchain provided in an example of the present subject matter. The block includes a block header and a block body. The block header includes a parent block hash value (Prev Block Hash), a time stamp (Timestamp), a version number (Version), a Merkel root hash value (Merkel Root Hash), a target value (Nonce), and a difficulty value (Difficulty Target). The block body includes a plurality of transactions (e.g. transaction 1, transaction 2, transaction 3, transaction 4 . . . transaction N in FIG. 3A).

In the part of the block header, the parent block hash value is used for connecting the block to the parent block, and a hash address of the parent block is recorded. The effect thereof may be embodied in the following two aspects: for one thing, all blockchain transaction information before the block may be traced back by a certain block, and the tracing effect is good; for another thing, as long as a block changes, the hash value of all blocks following the block will change, unless all blocks following the block are modified, reflecting the feature that the ledger cannot be modified or the modification cost cannot be borne. The time stamp marks the time of existence of the transaction. An ordered chain of time stamps is seen across the blockchain, and the time stamps are not modifiable. The version number describes the version number of a software or protocol update. The Merkel root hash value is a digital fingerprint of a transaction, which uniquely identifies some or all of the transaction data in a block body. As long as any transaction data participating in the construction of the Merkel root is modified, this digital fingerprint changes, thereby affecting the hash value of the block. As such, all the hash values corresponding to the following blocks are changed. The target value is a random number which is tentatively inputted by the user, and the initial value is 0. The target value is the key of the workload proving algorithm. Assuming that the hash value of the current block is equal to the hash value of performing a hash operation on the whole block header, the consensus node performs the Merkel root generated by hashing the transaction record before calculating the hash value (the Merkel root is a hash value), and then performs continuous trial input on the target value until the inputted target value is less than the threshold value of the hash value obtained by the current block. The difficulty value describes the difficulty target of the block workload proving algorithm.

In the part of the block body, it is the transaction stored in the block, including transaction number and transaction data. Specifically, the block body is divided into three parts: numTransactionsBytes, numTransactions, and transactions. The size of the numTransactionsBytes is 1 byte, and the number of bytes occupied by the transaction number is recorded; the size of the numTransactions is 0-8 bytes, and the transaction number in the block is recorded; the size of the transactions is uncertain, and multiple transaction data stored in the block is recorded. The numTransactions (the transaction number in the recording block) is an important field for storing transaction information, and the numTransactions (the transaction number in the recording block) partially use compressed storage, so that a large amount of storage space can be saved. The numTransactionsBytes field is present to indicate where the numTransactions is present in the block body in preparation for reading the transaction number.

In an example of the present subject matter, the block proposal information includes a block and a digital signature, the digital signature is obtained by performing digital signature processing on the block header information, and the block header information includes a first Merkel root determined based on transaction data in the block body information. The specific method of performing the digital signature and the specific method of calculating the first Merkel root will be described in detail in the following examples, which will not be described in detail in the example.

In the present subject matter, the block header information will refer to the part of the block header, the block body information will refer to the part of the block body, and the Merkel root will refer to the Merkel root hash value. Other relevant data may refer to the relevant description of the data structure in the above blockchain, which will not be described in detail in the subsequent examples of the present subject matter.

In some examples, since the consensus node may receive the block proposal information transmitted by a certain node (such as the above out-block node), but the node transmitting the block proposal information is not necessarily the main node responsible for out-block at the current stage. It may also be the block proposal information transmitted by an abnormal node. In order to ensure the security of the proposal, it is necessary to verify the node identification of the received block proposal information. Based on this, the block proposal information may include the node identification of the out-block node, and the implementation steps of verifying the node identification of the received block proposal information are as follows.

(1) Acquire a node identification of a main node responsible for out-block at a current stage and acquire the node identification of the out-block node from the block proposal information.

In an example of the present subject matter, the current stage refers to the block height, i.e. which block in the blockchain is currently processed. The main node responsible for out-block at the current stage is generated by selection. For example, the node 1 is responsible for out-block by selecting the $1000^{th}$-$1050^{th}$ block on the blockchain at the current stage, and then the node 1 is the node identification of the main node responsible for out-block at the current stage. Based on this, the consensus node may obtain the node identification of the main node according to the above method, and then obtain the node identification of the out-block node corresponding to the block proposal information from the block proposal information.

(2) Perform a step of the acquiring the block header information and the digital signature from the block proposal information and performing digest calculation on the block header information to obtain first digest information about the block header information when the node identification of the out-block node and the node identification of the main node are matched.

In the example of the present subject matter, by comparing the node identification of the out-block node with the node identification of the main node, the consensus node may determine whether the received block proposal information is transmitted by the main node responsible for out-block at the current stage, thereby ensuring the security of data. The step of the acquiring the block header information and the digital signature from the block proposal information and performing digest calculation on the block header information to obtain first digest information about the block header information may be continuously performed when the node identification of the out-block node and the node identification of the main node are matched. That is to say, step S202 to step S204 are continuously performed.

In some examples, if the node identification of the out-block node and the node identification of the main node are not matched, it indicates that the received block proposal information is not transmitted by the main node responsible for out-block at the current stage. The consensus node may reject to process the block proposal information, continue to wait for acquiring the next block proposal information, and then use the above provided node identification determination method to verify the main node until the acquired next block proposal information transmitted by the main node responsible for out-block at the current stage is detected. The consensus node then performs a blockchain operation (e.g. block consensus) on the block in the block proposal information after the verification is passed.

S202: Acquire the block header information and the digital signature of the block from the block proposal information, perform digest calculation on the block header information to obtain first digest information about the block header information, and perform de-signature processing on the digital signature to obtain second digest information about the block header information.

In an example of the present subject matter, the block header information stores the header information about the block, such as a parent block hash value (Prev Block Hash), a time stamp (Timestamp), a version number (Version), a Merkel root hash value (Merkel Root Hash), a target value (Nonce), and a difficulty value (Difficulty Target). By performing digest calculation on the block header information, the first digest information may be generated. That is to say, different block header information generates different digest information. Furthermore, any data in the same block header information is modified, and the generated digest information also changes.

The digital signature is extracted from the received block proposal information by the consensus node. Since the digital signature is determined by the out-block node based on the block header information, the consensus node may obtain the second digest information corresponding to the block header information by performing de-signature processing on the digital signature. Since the digital signature is generated based on the block header information, and the data volume thereof is small, in the process of block proposal information transmission, compared with signing the whole block (namely, the block header information and the block body information) and then transmitting the block proposal information, the transmission efficiency of the proposal is improved.

By comparing the first digest information and the second digest information corresponding to the block header information, the consensus node may determine whether the block header information about the block in the received block proposal information is tampered (if the first digest information and the second digest information are matched, it is determined that the block header information is tampered; if the first digest information and the second digest information are not matched, it is determined that the block header information is not tampered), ensuring the data accuracy of the block header information. Since in the example, only the correctness of the block header information is verified, but the block body information may also be tampered. It is also necessary to verify the block body information (such as transaction data). The present subject matter provides a method for verifying the block body information based on the Merkel root, and the specific operation steps will be described in detail in the subsequent examples, which will not be described in detail herein.

In some examples, the digital signature carries a public key used for decrypting the digital signature (or in other words, the consensus node stores a public key distributed by the out-block node and capable of decrypting the digital signature), and the above process of performing, by the consensus node, de-signature processing on the digital signature to obtain the second digest information about the block header information may be that the consensus node performs de-signature processing on the digital signature using the public key to obtain the second digest information about the block header information.

In some examples, the specific implementation steps of the performing digest calculation on the block header information to obtain first digest information about the block header information are as follows.

(1) Perform serialization processing on the block header information to obtain serialized data.

In the examples of the present subject matter, the serialization processing refers to a process of converting program data (such as block body data in the examples) into a format which can be stored and transmitted so as to realize storing, writing into a file, data transmission, and the like of the serialized data after serialization processing. The inverse process of the serialization processing is a de-serialization process, and the program data may be reconstructed based on the stream. In the present subject matter, storing and transmitting data can be easily achieved by combining the serialization processing and the de-serialization processing. The serialized data generated by the serialization technology is stored. When the program is re-run, or data processing is performed next time, only the stored serialized data needs to be read to perform relevant operations, which improves the data processing speed. This method is applied to the digest generation process in the present subject matter, and the digest generation efficiency is improved.

In some examples, the original ObjectOutputStream.write( ) and ObjectInputStream.read( ) methods based on Java may be used to perform serialization and de-serialization. Serialization and de-serialization may also be performed using JSON-based methods. Serialization and de-serialization may also be performed using XML-based methods.

(2) Perform digest calculation on the serialized data to obtain the first digest information about the block header information.

In the examples of the present subject matter, digest calculation refers to performing digital digest (also referred to as digital fingerprint or digital handprint) processing, namely, converting a message of any length into a short message of a fixed length by digital digest processing. The digital digest processing may be viewed as a function of processing an independent variable as a message of any length (i.e. a hash function). A one-way hash function is used to process plaintext to be encrypted into a string of ciphertext of a fixed length (128 bits). This ciphertext is also referred to as a digital fingerprint. Since different plaintext digests are ciphertext, the results are always different, while the digests of the same plaintext are consistent. By performing digest calculation on the serialized data, the consensus node only needs to compare whether the first digest information and the second digest information corresponding to the block header are consistent so as to confirm whether the block header information is tampered, thus ensuring the authenticity and integrity of the block header information.

In some examples, the digital digest processing may use a message-digest algorithm (MD5, a cryptographic hash function). By the MD5, a 128-bit (16-byte) hash value may be generated to ensure the integrity and consistency of information transmission. In addition, the digital digest processing may also be processed using any one of MD2, MD4, SHA1, SHA256, SHA384, and SHA512, which will not be described in detail in the example.

S203: Acquire the first Merkel root and the transaction data from the block proposal information and determine a second Merkel root based on the transaction data when the first digest information and the second digest information are matched.

In the example of the present subject matter, the first digest information and the second digest information are matched, and the consensus node may determine that the block header information about the block corresponding to the block proposal information is not tampered, ensuring the data accuracy of the block header information. Since the block body information may also be tampered, the block body information (e.g. transaction data) is also required to be verified.

Since the block header information includes the first Merkel root (a standard Merkel root) determined based on the transaction data in the block body information, the transaction data is acquired from the received block proposal information, and the second Merkel root is generated based on the transaction data. Comparing the first Merkel root with the second Merkel root as a reference basis, it can be verified whether the transaction data in the block body information is tampered, thereby ensuring the authenticity and integrity of the block body information (transaction data).

The above step of acquiring the first Merkel root from the block proposal information and the step of acquiring the transaction data may be performed simultaneously (for example, performing the step of acquiring the first Merkel root and the step of acquiring the transaction data simultaneously), or may be performed step by step (for example, performing the step of acquiring the first Merkel root first and then performing the step of acquiring the transaction data, or exchanging the order for processing).

In some examples, the above determining the second Merkel root based on the transaction data in the block proposal information may be implemented based on the following steps.

(1) Acquire a plurality of transaction data in block proposal information and a sequence of the plurality of transaction data.

In an example of the present subject matter, a plurality of transaction data in a block has a time sequence relationship, namely, a sequence. The sequence indicates a time when a transaction occurs for the plurality of transaction data. When calculating the second Merkel root of the transaction data, adding the sequence of the transaction data enriches the description dimension of data, and reflects the unique correspondence between the second Merkel root and the transaction data.

(2) Acquire a hash value of the plurality of transaction data.

This step is to separately acquire a hash value obtained by calculating each transaction data in the plurality of transaction data by a hash algorithm.

(3) Use a hash algorithm to calculate a plurality of first hash values corresponding to a plurality of first data groups. Each of the plurality of first data groups includes two adjacent transaction data ordered according to a sequence of the plurality of transaction data.

(4) Use the hash algorithm to calculate a plurality of second hash values corresponding to a plurality of second data groups. Each of the plurality of second data groups includes two adjacent first hash values.

(5) Determine a second Merkel root based on the plurality of second hash values.

Figure 3B:
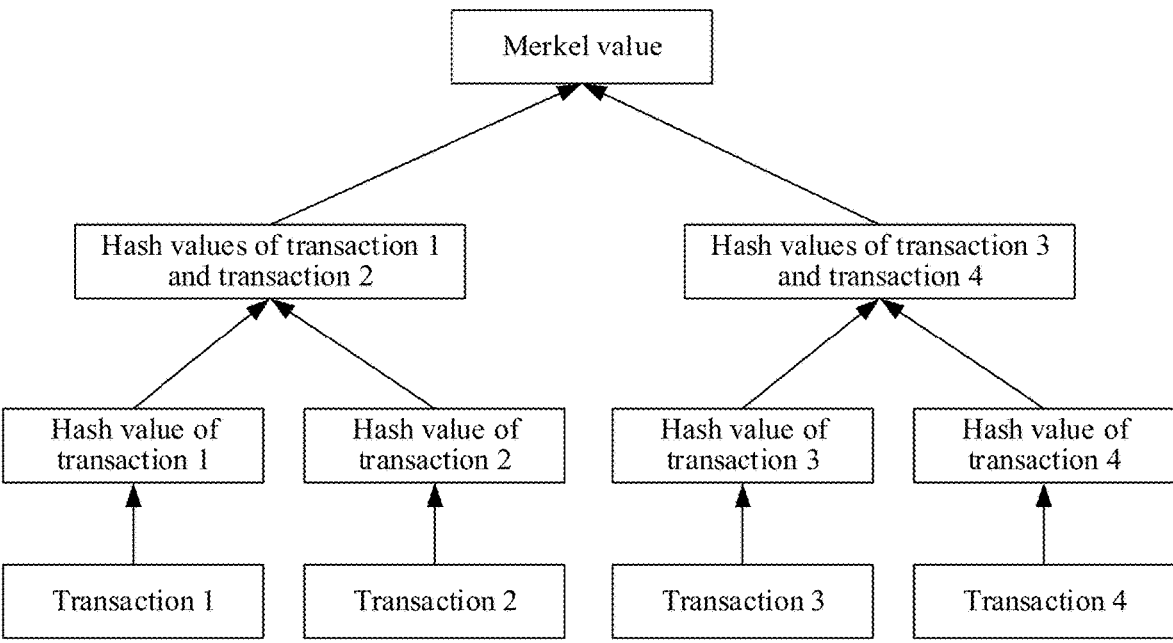
FIG. 3B is a flowchart of calculating a Merkel root provided in an example of the present subject matter.

Step (3) to step (5) are based on a binary tree calculation method. A hash value is calculated layer by layer, and finally the second Merkel root is obtained. Referring to FIG. 3B, FIG. 3B is a flowchart of calculating a Merkel root provided in an example of the present subject matter. The above step (1) to step (4) will be described in detail with reference to FIG. 3B. Illustratively, the block proposal information includes a plurality of transaction data (e.g. transaction 1, transaction 2, transaction 3, and transaction 4). Hash values of the plurality of transaction data are acquired (namely, performing a hash operation on the transaction 1 to obtain a hash value of the transaction 1, and according to the method, a hash value of the transaction 2, a hash value of the transaction 3 and a hash value of the transaction 4 may be obtained). Then a hash algorithm is used to calculate a plurality of first hash values corresponding to a plurality of first data groups, and the first data groups include two adjacent transaction data ordered according to a sequence of a plurality of transaction data (for example, according to a sequence of the transaction data 1-4, dividing 4 transaction data to obtain two first data groups, which are [a hash value of the transaction 1, a hash value of the transaction 2] and [a hash value of the transaction 3, a hash value of the transaction 4]). Then hash values corresponding to a plurality of first hash values are calculated (for example, hash values corresponding to [a hash value of the transaction 1, a hash value of the transaction 2] and hash values corresponding to [a hash value of the transaction 3, a hash value of the transaction 4]). A hash algorithm is used to calculate a plurality of second hash values corresponding to a plurality of second data groups, and each second data group includes two adjacent first hash values (for example, hash values corresponding to [a hash value of the transaction 1, a hash value of the transaction 2] and hash values corresponding to [a hash value of the transaction 3, a hash value of the transaction 4] are fused to obtain hash values corresponding to the transaction 1, the transaction 2, the transaction 3, and the transaction 4). By the above steps, all the transaction data may be calculated in turn based on a binary tree calculation, and finally a hash value corresponding to all the transactions is obtained as the second Merkel root.

When executing the step of calculating a plurality of second hash values corresponding to a plurality of second data groups using a hash algorithm (namely, the above step 3), there may be more than two second hash values. When there are more than two second hash values, the execution may be repeated with reference to the above step (1) to step (3) until only two hash values are generated. Then a hash operation is performed based on the two hash values to obtain a final hash value, and the final hash value is the second Merkel root.

The Merkel root in the above method is a digital fingerprint of the transaction data, which uniquely marks some or all of the transaction data in the block body. This digital fingerprint changes as long as any transaction data participating in the construction of the Merkel root is modified. By calculating the Merkel root and subsequently verifying whether the transaction data in the received block proposal information is tampered based on the Merkel root, the reliability and integrity of the data are ensured.

In some examples, when the number of the plurality of transaction data in the block proposal information is odd, it is also necessary to construct balance data, i.e. calculating the Merkel root based on the method provided above, and the specific operation steps are as follows.

(1) Construct balance data. The balance data is obtained by copying last transaction data of a plurality of transaction data.

(2) Add the balance data at an end of the plurality of transaction data.

In the example of the present subject matter, when the number of the plurality of transaction data is odd, the Merkel root cannot be calculated by the method provided above because the above method is implemented based on a binary tree classification method and cannot be applied to the case where the transaction data is odd. Thus, by copying the last transaction data of the plurality of transaction data and placing it as the balance data at the end of the transaction data, the Merkel root can be calculated based on the method provided above, ensuring the accuracy of the Merkel root.

In some examples, the balance data may be the last transaction data of the plurality of transaction data or may be any transaction data of the plurality of transaction data (e.g. the first transaction data of the plurality of transaction data), and the balance data may be added at the end of the plurality of transaction data or may be added to any position in the plurality of transaction data. This example also provides a construction and processing method for balance data with a better processing effect. Firstly, the balance data is constructed, and the balance data is obtained by copying the first transaction data in a plurality of transaction data. The balance data is then added to the header of the plurality of transaction data. The construction and processing method for balance data can be rationally configured according to different service data to obtain a better processing effect.

S204: Perform an operation on the block based on a comparison result of the first Merkel root and the second Merkel root.

In the examples of the present subject matter, based on the comparison result of the first Merkel root and the second Merkel root, it can be determined whether the block body information (transaction data) is authentic and integrated. In an example, the performing an operation on the block based on a comparison result of the first Merkel root and the second Merkel root may include the following steps.

(1) Perform consensus processing on the block when the comparison result indicates that the first Merkel root and the second Merkel root are matched.

When the comparison result indicates that the first Merkel root and the second Merkel root are matched, namely, it represents that in the block proposal information received by the consensus node, both the block header information and the block body information pass the data verification and are not tampered. Therefore, consensus processing may be performed on the block in the received block proposal information.

In an example, when the consensus node performs block consensus, data in the block in the received block proposal information can be compared and verified with data stored therein. If the data are matched, the block is confirmed to be consensus (namely, vote in favor during block consensus), and the consensus result is fed back to the out-block node to complete the block consensus.

(2) Reject to process the block and transmit feedback information to the out-block node when the comparison result indicates that the first Merkel root and the second Merkel root are not matched, the feedback information is used for indicating that the transaction data in the block is tampered.

In some examples, the Merkel root is one Hash value, and the comparison result of the first Merkel root and the second Merkel root may be a comparison of a first hash value corresponding to the first Merkel root and a second hash value corresponding to the second Merkel root. If the two hash values are the same, the comparison result indicates that they are matched; otherwise, the comparison result indicates that they are not matched. In some examples, when the first digest information is different from the second digest information, a first exception report may be generated. The first exception report is used for indicating that the block header information of the received block proposal information is tampered. When the comparison result indicates that the first Merkel root and the second Merkel root are different, a second exception report may be generated. The second exception report is used for indicating that the block body information (namely, transaction data) of the received block proposal information is tampered.

In an example of the present subject matter, the feedback information identifies the specific type of abnormal reception, i.e. the transaction data in the received block proposal information is tampered. In addition, when the comparison result indicated that the first Merkel root and the second Merkel root are matched, the first digest information and the second digest information are matched, and the first digest information and the second digest information are not matched, feedback information corresponding to different situations may be transmitted to the out-block node. The feedback information is used for indicating abnormal conditions of data in different situations, increasing the diversity of abnormal message prompting when data is abnormal, and also facilitating the consensus node and the out-block node to perform corresponding processing based on the diversified abnormal message prompting.

In some examples, when the comparison result indicates that the first Merkel root and the second Merkel root are not matched, the following operations may be performed.

(1) Receive encrypted block proposal information transmitted by the out-block node, the encrypted block proposal information is obtained by the out-block node which verifies the transaction data in the block included in the block proposal information when the number of consensus nodes returning the feedback information meets a message retransmission condition and encrypts the block proposal information using node public keys of all the consensus nodes in the blockchain network when a verification result indicates that verification is passed.

In an example of the present subject matter, the feedback information returned by the consensus node is used for indicating that the transaction data in the block is tampered. The message retransmission condition may be a number threshold value (e.g. ⅔), i.e. when the out-block node detects that the number of the consensus nodes returning the feedback information reaches the number threshold value, the transaction data in the block included in the block proposal information is verified. The verification result indicating that the verification is passed means that the out-block node verifies the transaction data in the block; if it is found that the data is correct, the verification result is determined that the verification is passed.

It can be appreciated that the block proposal information received by the consensus node includes the transaction data. If there is an error in the transaction data, at least the following two cases are included.

The first is that the transaction data packed by the out-block node itself appears abnormal, resulting in abnormal transaction data received by the consensus node; the second is that the transaction data packed by the out-block node itself is correct, but the transaction data appears abnormal when the consensus node receives the transaction data. The consensus node will return the feedback information to the out-block node. When the out-block node receives the feedback information transmitted by a certain number of consensus nodes, the out-block node will determine whether the data thereof is abnormal or the data is abnormal in the process of receiving, by the consensus node, the block proposal information, thus resulting in that the data finally received by the consensus node is erroneous (namely, verifying the transaction data in the block included in the block proposal information). When the out-block node detects that no abnormality occurs in its own data (namely, a verification result indicates that verification is passed), the block proposal information is encrypted using node public keys of all the consensus nodes in the blockchain network to obtain encrypted block proposal information. The consensus node may receive the encrypted block proposal information to retrieve the block proposal information.

(2) Decrypt the encrypted block proposal information using node private keys corresponding to the node public keys to obtain decrypted block proposal information.

In some examples, the above node public key and node private key may each generate only one piece. For example, there is an out-block node (a main node) and a plurality of consensus nodes. The out-block node encrypts using a unique node public key to obtain the encrypted block proposal information, and then separately transmits the encrypted block proposal information to the plurality of consensus nodes. The plurality of consensus nodes decrypt the encrypted block proposal information using a unique node private key to obtain the decrypted block proposal information. This method may be better applied in the case of reliable transmission environment (e.g. consortium blockchain) because only the unique node public key is used for encryption to generate one piece of encrypted block proposal information. It does not need to generate the corresponding encrypted block proposal information multiple times based on different consensus nodes, and the proposal efficiency is improved. At the same time, the consensus node receives the encrypted block proposal information transmitted by the out-block node, and then decrypts same to obtain the block proposal information, which can further reduce the risk of abnormal data when receiving the block proposal information, and ensure the accuracy and integrity of the data of the received block proposal information.

(3) Verify data included in the decrypted block proposal information and perform the operation on the block based on the verification result.

In the example of the present subject matter, when the comparison result indicates that the first Merkel root and the second Merkel root are not matched, the encrypted block proposal information transmitted by the out-block node is received, and decryption is performed based on the encrypted block proposal information to obtain the decrypted block proposal information. Then the data included in the decrypted block proposal information is verified, and the operation is performed on the block based on the verification result. The method for verifying the data included in the decrypted block proposal information may refer to the above step S202 to step S204 and the detailed description of various examples included therein, which will not be described in detail in the example.

Figure 3C:
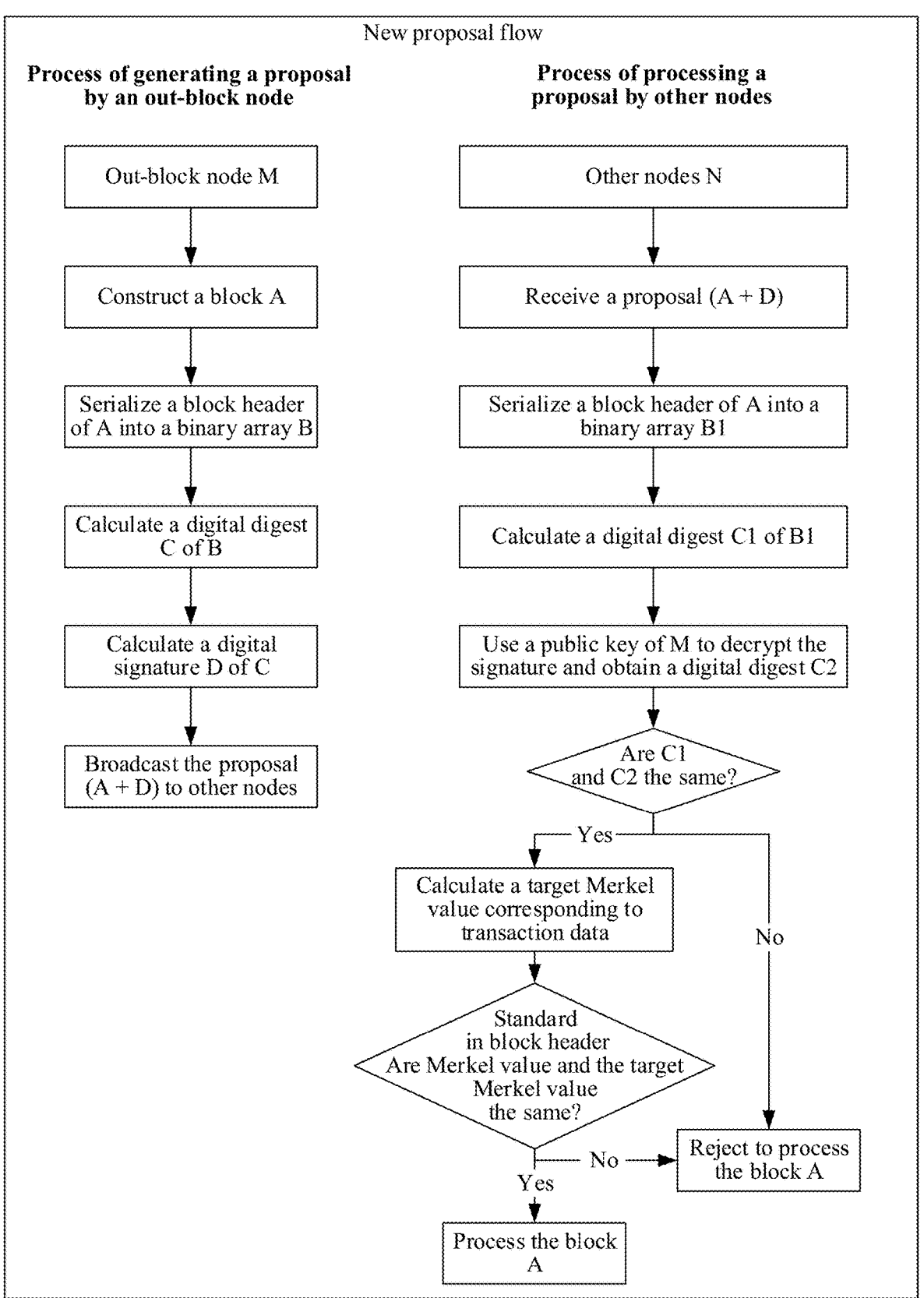
FIG. 3C is a flowchart of a blockchain-based proposal provided in an example of the present subject matter.

Reference may be made to FIG. 3C. FIG. 3C is another blockchain proposal method provided based on the above method in the examples of the present subject matter. A flow of the blockchain proposal includes two parts: generating a proposal by an out-block node and processing a proposal by a consensus node.

In the process of generating a proposal by an out-block node, the out-block node M first constructs a block A; serializes the block header of the block A (i.e., the block header information in the present subject matter) into a binary array B; then performs digest calculation on the binary array B to obtain a digital digest C; signs the digital digest C to obtain a digital signature D; finally packs the block A and the digital signature D into a proposal (A+D) and broadcasts same to a consensus node.

In the process of processing a proposal by a consensus node, the consensus node N first receives the proposal (A+D) broadcasted by the out-block node; extracts the block A in the proposal (A+D) and serializes the block header of the block A in the proposal (i.e., the block header information in the present subject matter) into a binary array B 1; then performs digest calculation on the binary array B1 to obtain a digital digest C1; uses a public key of the out-block node to decrypt the digital signature D to obtain a digital digest C2; finally compares the digital digest C1 with the digital digest C2, rejects to process the block A if C1 is not equal to C2, and calculates the Merkel hash value corresponding to the transaction data in the block A (i.e. the second Merkel root in the present subject matter) if C1 equals to C2. Then it compares the first Merkel root and the second Merkel root in the block header. If the first Merkel root and the second Merkel root are the same, the consensus node will process the block A; if the first Merkel root and the second Merkel root are different, the consensus node rejects to process the block A.

By the above method, the blockchain proposal may be realized. The out-block node constructs a digital signature based on block header information in a block, packs the block and the digital signature into a proposal, and transmits same to the consensus node. The consensus node receives the block and the digital signature, generates a digital digest by the block header information in the block, and decrypts the received digital signature to generate another digital digest. By comparing the two summaries, the consensus node may verify the authenticity and integrity of the block header information in the received proposal. Then the second Merkel root value is generated based on the block body information in the proposal. Compared with the first Merkel root value of the block header information in the block, the consensus node may verify the authenticity and integrity of the block body information in the received proposal.

Since it takes a large amount of time to construct a digital signature during a proposal process, and it takes a small amount of time to calculate a second Merkel root value using transaction data, based on the method provided in the present subject matter, when constructing the digital signature, only block header information with a small amount of data needs to be processed, and there is no need to serialize a large transaction list (i.e. block body information). As such, the data volume involved in constructing the digital signature is greatly reduced. Then a second Merkel root is calculated based on the transaction data in the received region block body information. Compared with the first Merkel root, it ensures the authenticity and integrity of the block body information in the proposal. In the overall process, it greatly improves the efficiency of the proposal and also ensures the message credibility of the proposal.

In some examples, due to the real time of the out-block nodes when broadcasting, the consensus node may not receive the block proposal information within a limited time or may not receive the integrated block proposal information. Therefore, the receiving situation of the block proposal information may be acquired first, and then subsequent operations are performed based on the receiving situation. The specific steps are as follows.

(1) Determine whether block proposal information transmitted by an out-block node is successfully received within a target time.

(2) Perform the step of performing digest calculation on block header information in the block proposal information to obtain first digest information when the block proposal information transmitted by the out-block node is successfully received within the target time.

(3) Broadcast a target message to a consensus node in a blockchain network when the block proposal information transmitted by the out-block node is not successfully received within the target time. The target message is used for indicating that receiving the block proposal information fails.

In an example of the present subject matter, determining whether block proposal information transmitted by an out-block node is successfully received within a target time may be verified from a plurality of dimensions. Exemplarily, the integrity of the block proposal information may be tested. If only block header information or only block body information exists in the received data packet, it is determined that the received block proposal information is not integrated. At this moment, it can be seen as the above case that the block proposal information transmitted by the out-block node is not successfully received within the target time. Then the target message is broadcasted to the consensus node in the blockchain network, and the target message is used for indicating that receiving the block proposal information fails, may also indicate that the block proposal information is not integrated, and indicates a lost data type. The target message indicates the related message about the failure of the block proposal information in different dimensions, and the richness of the dimension of the exception prompt message is further improved. It is convenient for the consensus node to execute the respective operation and maintenance operation based on the exception report.

In summary, in the present subject matter, using the characteristics of a blockchain data structure, in the process of processing a proposal by a consensus node, the block proposal information transmitted by an out-block node is received. Then digest calculation is performed on the block header information in the block proposal information to obtain first digest information, and de-signature processing is performed on the digital signature in the block proposal information to obtain second digest information. Since the first digest information and the second digest information are generated from respective block header information, data verification may be performed on the block header information by comparing the first digest information and the second digest information so as to ensure the correctness of the block header information. If the first digest information and the second digest information are matched, a second Merkel root is calculated according to the received transaction data, and the second Merkel root is compared with the first Merkel root in the block proposal information. Since the Merkel root may uniquely identify some or all of the transaction data in the block body, data verification may be performed on the block body information (transaction data) so as to ensure the correctness of the block body information. Compared with performing digest processing on a large number of transaction data to achieve data verification, this method improves the efficiency of processing the proposal. In the process of proposal transmission, since the digital signature is generated based on the block header information, the data volume thereof is small, and the efficiency of proposal transmission is improved compared with signing the whole block (namely, the block header information and the block body information). The consensus node finally performs a respective operation on the block based on the comparison result.

The present subject matter also provides a method for constructing balance data, which improves the applicability of the method for verifying transaction data by a Merkel root. The consensus node finally performs a respective operation on the block based on the comparison result. By the above method, the production efficiency of the proposal is improved while ensuring the reliability of the block proposal information. The present subject matter also performs node identification verification by acquiring a node identification of a main node responsible for out-block at the current stage and a node identification of received block proposal information, so as to avoid receiving block proposal information transmitted by an abnormal node and ensure the security of the proposal. In the present subject matter, by performing serialization processing on the block header information and then performing digest calculation to acquire digest information corresponding to the block header information, the efficiency of digest generation is improved.

The present subject matter provides that when it is detected that the comparison result of the first Merkel root and the second Merkel root are not matched, the consensus node rejects to process the block and transmits feedback information for indicating that the transaction data in the block is tampered and a variety of generated abnormal information indicating the case of occurring an exception for the determination results (such as the comparison results of the digest information are not consistent, and the comparison results of the Merkel root are not consistent) at different stages to the out-block node, which improves the richness of the dimension of the exception prompt information, and facilitates the consensus node and the out-block node to perform respective processing based on the diversified exception prompt information. The present subject matter also provides that the consensus node receives the encrypted block proposal information transmitted by the out-block node and decrypts same to obtain new block proposal information, which can further reduce the risk of abnormal data when the consensus node receives the block proposal information, and further ensure the accuracy of receiving the block proposal information. The present subject matter also provides that after receiving the block proposal information, the consensus node verifies the integrity of the received block proposal information and generates a target message capable of indicating the integrity verification situation, thereby further improving the richness of the dimension of the exception prompt message. By the above method, the efficiency of generating a proposal by an out-block node and processing a proposal by a consensus node can be improved while ensuring the credibility of the block proposal information.

Reference will be made to FIG. 4, and FIG. 4 shows a flowchart of a blockchain-based data processing method provided in an example of the present subject matter. The data processing method in an example of the present subject matter is described on the out-block node side. The blockchain-based data processing method may include the following steps.

S401: Create a block, the block including block header information and block body information, the block body information including transaction data, and the block header information including a first Merkel root determined based on the transaction data.

In an example of the present subject matter, the out-block node needs to create a block before performing an out-block operation (e.g. performing block consensus), and the block is the original data of performing the out-block operation by the out-block node. The block includes a block header and a block body. The block header includes a parent block hash value (Prev Block Hash), a time stamp (Timestamp), a version number (Version), a Merkel root hash value (Merkel Root Hash), a target value (Nonce), and a difficulty value (Difficulty Target). The block body includes a plurality of transactions (e.g. transaction 1, transaction 2, transaction 3, transaction 4 . . . transaction N in FIG. 3A). The specific structure of the block is shown in FIG. 3A, and a detailed description of the block is shown in the relevant description of the previous example, which will not be described in detail in the example.

The block header information includes a first Merkel root, and the first Merkel root is determined based on the transaction data. The method for determining the first Merkel root based on the transaction data is shown in FIG. 3B and the method for determining the second Merkel root based on the transaction data in the block proposal information in the previous examples, which will not be described in detail in the example.

S402: Perform digital signature processing on the block header information to obtain a digital signature and generate block proposal information based on the block and the digital signature.

In some examples, the specific implementation steps of the performing digital signature processing on the block header information to obtain a digital signature are as follows.

(1) Perform serialization processing on the block header information to obtain serialized data.

In the examples of the present subject matter, the serialization processing refers to a process of converting program data (such as block body data in the examples) into a format which can be stored and transmitted so as to realize storing, writing into a file, data transmission, and the like of the serialized data after serialization processing. The inverse process of the serialization processing is a de-serialization process, and the program data may be reconstructed based on the stream. In the present subject matter, storing and transmitting data can be easily achieved by combining the serialization processing and the de-serialization processing. The serialized data generated by the serialization technology is stored. When the program is re-run, or data processing is performed next time, only the stored serialized data needs to be read to perform relevant operations, which improves the data processing speed. This method is applied to the digest generation process in the present subject matter, and the digest generation efficiency is improved.

In some examples, the original ObjectOutputStream.write( ) and ObjectInputStream.read( ) methods based on Java may be used to perform serialization and de-serialization. Serialization and de-serialization may also be performed using JSON-based methods. Serialization and de-serialization may also be performed using XML-based methods.

The method for the out-block node to perform serialization processing on the block header information to obtain the serialized data may be seen from the relevant description of the method for the consensus node to perform serialization processing on the block header information to obtain the serialized data in the above examples, which will not be described in detail in the example.

(2) Perform digest calculation on the serialized data to obtain the second digest information about the block header information.

In the examples of the present subject matter, digest calculation refers to performing digital digest (also referred to as digital fingerprint or digital handprint) processing, namely, converting a message of any length into a short message of a fixed length. The digital digest processing may be viewed as a function of processing an independent variable as a message of any length (i.e. a hash function). A one-way hash function is used to process plaintext to be encrypted into a string of ciphertext of a fixed length (128 bits). This ciphertext is also referred to as a digital fingerprint. Since different plaintext digests are ciphertext, the results are always different, while the digests of the same plaintext are consistent. By performing digest calculation on the serialized data, the consensus node only needs to compare whether the first digest information and the second digest information corresponding to the block header are consistent so as to confirm whether the block header information is tampered, thus ensuring the authenticity and integrity of the block header information.

In some examples, the digital digest processing may use a message-digest algorithm (MD5, a cryptographic hash function). By the MD5, a 128-bit (16-byte) hash value may be generated to ensure the integrity and consistency of information transmission. In addition, the digital digest processing may also be processed using any one of MD2, MD4, SHA1, SHA256, SHA384, and SHA512, which will not be described in detail in the example.

The method for the out-block node to perform digest calculation on the serialized data to obtain the second digest information about the block header information may refer to the relevant description of the method for the consensus node to perform digest calculation on the serialized data to obtain the first digest information about the block header information in the above examples, which will not be described in detail in the example.

(3) Encrypt the second digest information using a signature private key to obtain the digital signature.

In the examples of the present subject matter, the use of the digital signature method has two roles, namely verification and encryption. The verification refers to verifying the identity of a message transmitter (namely, an out-block node) to prevent forgers; the encryption refers to encrypting the plaintext (i.e. the second digest information) to prevent leakage to the non-message receiver. The digital signature may be implemented using a "symmetric encryption" method (encryption and decryption use the same key and require a third-party arbitrator) or an "asymmetric encryption" method (information encrypted with a public key can only be decrypted with a private key. In the same way, something encrypted with a private key only can be decrypted with a public key. Two key pairs are used, each key pair includes a public key and a private key, and the digital signature may be completed without the need for third-party arbitration).

S403: Transmit the block proposal information to each consensus node in the blockchain network to enable each consensus node in the blockchain network to verify data included in the decrypted block proposal information and perform the operation on the block based on the verification result.

In the examples of the present subject matter, the block proposal information is generated by packing a block and a digital signature. The block proposal information is transmitted to each consensus node in the blockchain network. It waits for each consensus node data to perform verification on the received block proposal information. When the out-block node receives a verification result returned by each consensus node, it can be determined based on the verification result whether each consensus node reaches a consensus on the block in the block proposal information to perform a subsequent blockchain operation (such as block uplink).

In some examples, the digital signature in the block proposal information further carries a public key used for decrypting the digital signature (or in other words, the consensus node stores a public key distributed by the out-block node and capable of decrypting the digital signature), and the above process of performing de-signature processing on the digital signature to obtain the second digest information about the block header information may be that the out-block node performs de-signature processing on the digital signature using the public key to obtain the second digest information about the block header information.

In an example, the consensus node rejects to process the block and transmits feedback information to the out-block node when it detects the comparison result, which indicates that the first Merkel root and the second Merkel root are not matched, feedback information is used for indicating that the transaction data in the block is tampered. The out-block node may receive the feedback information returned by the consensus node and perform a receive operation based on the feedback information. The specific methods includes the following steps.

(1) Receive feedback information returned by at least one consensus node in the blockchain network, the feedback information is used for indicating that the transaction data in the block is tampered; verify the transaction data in the block included in the block proposal information when the number of consensus nodes returning the feedback information meets a message retransmission condition.

In an example of the present subject matter, the feedback information returned by the consensus node is used for indicating that the transaction data in the block is tampered. The message retransmission condition may be a number threshold value (e.g. $2/3$), i.e. when the out-block node detects that the number of the consensus nodes returning the feedback information reaches the number threshold value, the transaction data in the block included in the block proposal information is verified. The verification result indicating that the verification is passed means that the out-block node verifies the transaction data in the block; if it is found that the data is correct, the verification result is determined that the verification is passed.

It can be appreciated that the block proposal information received by the consensus node includes the transaction data. If there is an error in the transaction data, at least the following two cases are included. The first is that the transaction data packed by the out-block node itself appears abnormal, resulting in abnormal transaction data received by the consensus node; the second is that the transaction data packed by the out-block node itself is correct, but the transaction data appears abnormal when the consensus node receives the transaction data. The consensus node will return the feedback information to the out-block node. When the out-block node receives the feedback information transmitted by a certain number of consensus nodes, the out-block node will determine whether the data thereof is abnormal or the abnormality occurs when the consensus node receives the block proposal information, thus resulting in that the data finally received by the consensus node is erroneous (namely, verifying the transaction data in the block included in the block proposal information). When the out-block node detects that no abnormality occurs in its own data (namely, a verification result indicates that verification is passed), the block proposal information is encrypted using node public keys of all the consensus nodes in the blockchain network to obtain encrypted block proposal information. The above method may be understood as: the out-block node receives feedback information that transaction data of the consensus node is tampered, verifies the transaction data thereof, and encrypts and transmits block proposal information when the data is found to be correct (namely, when the consensus node receives data, the data is abnormal). The consensus node may receive the encrypted block proposal information to retrieve the block proposal information.

In some examples, the out-block node receives feedback information returned by at least one consensus node in the blockchain network, and the feedback information may be multi-dimensional. Exemplarily, the feedback information may be that the consensus node tests the integrity of the block proposal information. If only block header information or only block body information exists in the received data packet, it is determined that the received block proposal information is not integrated (At this moment, it can be seen as the above case that the block proposal information transmitted by the out-block node is not successfully received within the target time). Then the feedback information is returned to the out-block node, and the feedback information is used for indicating that receiving the block proposal information fails. At the same time, the feedback information may also indicate that the block proposal information is not integrated and indicate the lost data type. The out-block node receives the feedback information of multiple dimensions returned by the consensus node in the blockchain network, which improves the richness of the dimension of the exception prompt message, and facilitates the out-block node to execute a respective operation based on the received feedback information of multiple dimensions.

(2) Encrypt the block proposal information using node public keys of all the consensus nodes in the blockchain network when a verification result indicates that verification is passed to obtain encrypted block proposal information.

(3) Transmit the encrypted block proposal information to each consensus node in the blockchain network.

In an example of the present subject matter, the out-block node transmits encrypted block proposal information to a consensus node for the consensus node to use a node private key to decrypt same to obtain the block proposal information, which can improve the success rate of delivering the block proposal information, reduce the risk of abnormal data occurring when the consensus node receives the block proposal information, and improve the accuracy and integrity of the data of the received block proposal information.

In some examples, the feedback information is transmitted when the consensus node detects that the first Merkel root and the second Merkel root included in the block proposal information are not matched. The second Merkel root is determined based on the transaction data in the block proposal information when the consensus node detects that the first digest information and the second digest information about the block header information are not matched. The first digest information is obtained by performing, by the consensus node, digest calculation on block header information in the block proposal information, and the first digest information is obtained by performing, by the consensus node, de-signature processing on the digital signature in the block proposal information.

The introduction of the feedback information, the second Merkel root, the first digest information, and the second digest information may refer to the relevant description of the above examples of the present subject matter, which will not be described in detail in the example.

In some examples, the process of determining, by the out-block node, the first Merkel root of the block may be implemented according to the following steps.

(1) Acquire a plurality of transaction data in block body information and a sequence of the plurality of transaction data.

(2) Determine a plurality of first hash values corresponding to a plurality of first data groups according to a hash algorithm. Each of the plurality of first data groups includes two adjacent transaction data ordered according to a sequence of the transaction data.

(3) Determine a plurality of second hash values corresponding to a plurality of second data groups according to the hash algorithm. Each of the plurality of second data groups includes two adjacent first hash values.

(4) Determine a first Merkel root based on the plurality of second hash values.

The above specific implementation process may refer to the relevant description of determining, by the consensus node, the second Merkel root in the above examples of the present subject matter, which will not be described in detail in the example.

In some examples, when the number of the plurality of transaction data in the block proposal information is odd, the out-block node also needs to construct balance data, i.e. calculating the Merkel root based on the method provided above, and the specific operation steps are as follows.

(1) Construct balance data. The balance data is obtained by copying last transaction data of a plurality of transaction data.

(2) Add the balance data at an end of the plurality of transaction data.

In the example of the present subject matter, when the number of the plurality of transaction data is odd, the Merkel root cannot be calculated by the method provided above because the above method is implemented based on a binary tree classification method and cannot be applied to the case where the transaction data is odd. Therefore, by copying the last transaction data of the plurality of transaction data and placing it as the balance data at the end of the transaction data, the out-block node cam calculate the Merkel root based on the method provided above, ensuring the accuracy of the Merkel root.

In some examples, the balance data may be the last transaction data of the plurality of transaction data or may be any transaction data of the plurality of transaction data (e.g. the first transaction data of the plurality of transaction data), and the balance data may be added at the end of the plurality of transaction data or may be added to any position in the plurality of transaction data. The construction and processing method for balance data can be rationally configured according to different service data to obtain a better processing effect.

In some examples, the out-block node may perform an operation on the block based on the verification result. The verification result may be a voting result of the consensus node for the block proposal information, and then performing, by the out-block node, an operation on the block based on the verification result may include the following steps.

(1) Receive a voting result of the consensus node in the blockchain network for the block proposal information.

(2) Determine a consensus result based on the voting result.

In some examples, an implementation method of determining the consensus result based on the voting result may include the following steps.

1) Determine the number of voting results that the voting results are in favor and determine a total number of voting results of the voting results.

2) Calculate a ratio between the number of voting results that the voting results are in favor and the total number of voting results and detect whether the ratio is greater than a proportion threshold value.

3) Determine the consensus result as reaching a consensus when the ratio is greater than the proportion threshold value and determine the consensus result as not reaching a consensus when the ratio is less than or equal to the proportion threshold value.

(3) Uplink the block to the blockchain when the consensus result is reaching a consensus.

In an example of the present subject matter, the voting result may be result data obtained after the consensus node verifies the validity of the transaction data in the block, the execution order of each transaction corresponding to the transaction data, and the like (for example, approving or disapproving). The out-block node receives the voting result of each consensus node and determines whether to uplink the block based on the voting result. For example, if more than ⅔ of the consensus nodes agree to uplink the block to the blockchain (i.e. more than ⅔ of the consensus nodes agree and reach a consensus), then the block is added to the blockchain.

In summary, in the present subject matter, using the characteristics of the blockchain data structure, in the process of a blockchain proposal, the out-block node directly constructs a digital signature by the block header information. Compared with signing the whole block (i.e. the block header information and the block body information), the data volume involved in constructing a digital signature is greatly reduced, and the time consumption for constructing a digital signature is reduced. At the same time, the first Merkel value determined based on the transaction data is stored in the block for the consensus node to verify the received transaction data. It realizes the verification of the block header information and the transaction data, and ensures the accuracy of the processing result after processing based on the block proposal information. The out-block node generates the block proposal information based on the digital signature and the block, which improves the efficiency of generating the proposal by the out-block node. The out-block node finally transmits the block proposal information to the consensus node and performs a respective operation on the block based on the verification result returned by the consensus node.

The present subject matter provides that when the consensus node detects that the comparison result of the first Merkel root and the second Merkel root are not matched, the out-block node acquires transmitted feedback information for indicating that the transaction data in the block is tampered and a variety of abnormal information for the determination results (such as the comparison results of the digest information are not consistent, and the comparison results of the Merkel root are not consistent) generated by the consensus node at different stages, which improves the richness of the dimension of the exception prompt information, and facilitates the out-block node to perform respective processing based on the diversified exception prompt information. The present subject matter also provides that when it is detected that the number of consensus nodes not successfully receiving the block proposal information reaches a threshold value, the out-block node transmits encrypted block proposal information to the consensus node to reduce the risk of abnormal data when the consensus node receives the block proposal information and ensure the accuracy and integrity of the data of the received block proposal information. The present subject matter also provides that the out-block node may determine whether the requirement of block uplink is reached based on the verification result to decide whether to perform an uplink operation on the block. The present subject matter also provides a method for determining the second Merkel root by the out-block node and constructing balance data, which improves the applicability of the method for verifying transaction data by a Merkel root. The present subject matter also provides that the out-block node performs serialization processing on the block header information and then performs digest calculation to acquire digest information corresponding to the block header information, and the efficiency of digest generation is improved.

With reference to FIG. 5A, a schematic structural diagram of a blockchain-based data processing apparatus provided in an example of the present subject matter is shown. The data processing apparatus described in the example may be applied to the consensus node described above, and the data processing apparatus includes:

a data acquisition module 501, configured to receive block proposal information transmitted by an out-block node, the block proposal information including a block constructed by the out-block node and a digital signature corresponding to the block, the block including block header information and block body information, the digital signature is obtained by performing digital signature processing on the block header information, and the block header information including a first Merkel root determined based on transaction data in the block body information; and a processing module 502, configured to acquire the block header information and the digital signature from the block proposal information, perform digest calculation on the block header information to obtain first digest information about the block header information and perform de-signature processing on the digital signature to obtain second digest information about the block header information, the processing module 502 is further configured to acquire the first Merkel root and the transaction data from the block proposal information and determine a second Merkel root based on the transaction data when the first digest information and the second digest information are matched, and the processing module 502 is further configured to perform an operation on the block based on a comparison result of the first Merkel root and the second Merkel root.

In some examples, in performing an operation on the block based on a comparison result of the first Merkel root and the second Merkel root, the processing module 502 is specifically configured to:

perform consensus processing on the block when the comparison result indicates that the first Merkel root and the second Merkel root are matched; and reject to process the block and transmit feedback information to the out-block node when the comparison result indicates that the first Merkel root and the second Merkel root are not matched, the feedback information is used for indicating that the transaction data in the block is tampered.

In some examples, the above block proposal information further includes a node identification of the above out-block node, and the above processing module 502 is further configured to:

acquire a node identification of a main node responsible for out-block at a current stage and acquire the node identification of the out-block node from the block proposal information; and perform a step of the acquiring the block header information and the digital signature from the block proposal information and performing digest calculation on the block header information to obtain first digest information about the block header information when the node identification of the out-block node and the node identification of the main node are matched.

In some examples, the above processing module 502 is further configured to:

receive encrypted block proposal information transmitted by the out-block node when the comparison result indicates that the first Merkel root and the second Merkel root are not matched, the encrypted block proposal information is obtained by the out-block node which verifies the transaction data in the block comprised in the block proposal information when the number of consensus nodes transmitting the feedback information meets a message retransmission condition and encrypts the block proposal information using node public keys of all the consensus nodes in the blockchain network when a verification result indicates that verification is passed;

decrypt the encrypted block proposal information using node private keys corresponding to the node public keys to obtain decrypted block proposal information; and verify data included in the decrypted block proposal information and perform the operation on the block based on the verification result.

In some examples, in performing digest calculation on the block header information to obtain first digest information about the block header information, the above processing module 502 is specifically configured to:

perform serialization processing on the block header information to obtain serialized data; and perform digest calculation on the serialized data to obtain the first digest information about the block header information.

With reference to FIG. 5B, a schematic structural diagram of another blockchain-based data processing apparatus provided in an example of the present subject matter is shown. The data processing apparatus described in the example may be applied to the out-block node, and the data processing apparatus includes:

a data acquisition module 521, configured to create a block, the block including block header information and block body information, the block body information including transaction data, and the block header information including a first Merkel root determined based on the transaction data; and a processing module 522, configured to perform digital signature processing on the block header information to obtain a digital signature and generate block proposal information based on the block and the digital signature, and the processing module 522 is further configured to transmit the block proposal information to each consensus node in the blockchain network, each consensus node in the blockchain network acquiring the block header information and the digital signature from the block proposal information, performing digest calculation on the block header information to obtain first digest information about the block header information and performing de-signature processing on the digital signature to obtain second digest information about the block header information, acquiring the first Merkel root and the transaction data from the block proposal information and determining a second Merkel root based on the transaction data when the first digest information and the second digest information are matched, and performing an operation on the block based on a comparison result of the first Merkel root and the second Merkel root.

In some examples, the above processing module 522 is further configured to:

receive feedback information returned by at least one consensus node in the blockchain network, the feedback information is used for indicating that the transaction data in the block is tampered; verify the transaction data in the block included in the block proposal information when the number of consensus nodes returning the feedback information meets a message retransmission condition;

encrypt the block proposal information using node public keys of all the consensus nodes in the blockchain network when a verification result indicates that verification is passed to obtain encrypted block proposal information; and transmit the encrypted block proposal information to each consensus node in the blockchain network.

In some examples, the feedback information is transmitted when the consensus node detects that the first Merkel root and the second Merkel root included in the block proposal information are not matched.

In some examples, in performing digital signature processing on the block header information to obtain a digital signature, the above processing module 522 is specifically configured to:

perform serialization processing on the block header information to obtain serialized data;

perform digest calculation on the serialized data to obtain the second digest information about the block header information; and encrypt the second digest information using a signature private key to obtain the digital signature.

The functions of each functional module of the data processing apparatus according to the example of the present subject matter may be specifically implemented according to the method in the above method example, and the specific implementation process thereof may refer to the relevant description of the above method example, which will not be described in detail herein.

The term module (and other similar terms such as unit, subunit, submodule, etc.) in the present disclosure may refer to a software module, a hardware module, or a combination thereof. Modules implemented by software are stored in memory or non-transitory computer-readable medium. The software modules, which include computer instructions or computer code, stored in the memory or medium can run on a processor or circuitry (e.g., ASIC, PLA, DSP, FPGA, or other integrated circuit) capable of executing computer instructions or computer code. A hardware module may be implemented using one or more processors or circuitry. A processor or circuitry can be used to implement one or more hardware modules. Each module can be part of an overall module that includes the functionalities of the module. Modules can be combined, integrated, separated, and/or duplicated to support various applications. Also, a function is performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices and stored in memory or non-transitory computer readable medium.

Figure 6:
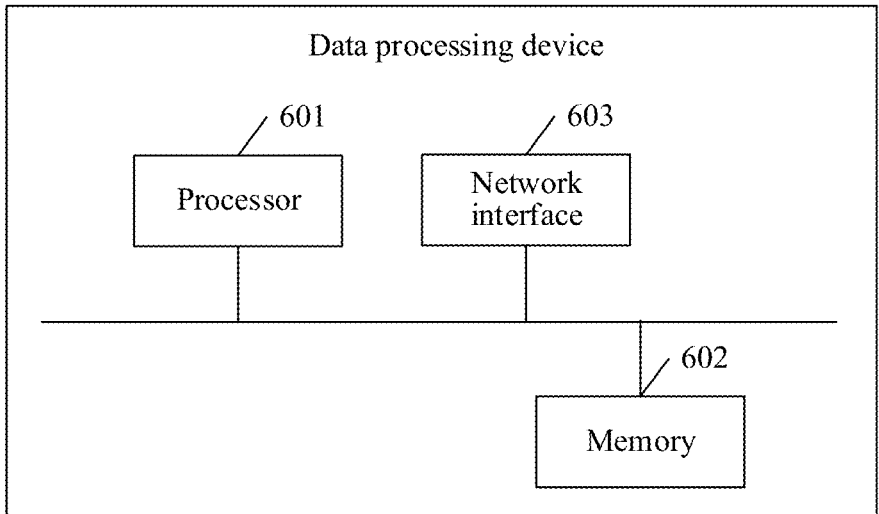
FIG. 6 is a schematic block diagram of a data processing device provided in an example of the present subject matter.

With reference to FIG. 6, a schematic structural diagram of a data processing device provided in an example of the present subject matter is shown. The data processing device described in this example includes: a processor 601, a memory 602, and a network interface 603. The processor 601, the memory 602, and the network interface 603 interact data with each other.

The processor 601 may be a central processing unit (CPU), another general-purpose processor, a digital signal processor (DSP), an application specific integrated circuit (ASIC), a field-programmable gate array (FPGA), other programmable logic devices, a discrete gate or transistor logic device, a discrete hardware component, and the like. The general-purpose processor may be a microprocessor, or, the processor may be any conventional processor and the like.

The memory 602 may include a read-only memory (ROM) and a random access memory (RAM), and provides program instructions and data to the processor 601. A portion of the memory 602 may also include a non-volatile random access memory.

In particular implementations, the processor 601, the storage apparatus 602, and network interface 603 described in examples of the present subject matter may perform implementations described in related examples of the data processing method provided by the examples of the present subject matter shown in FIG. 2 or FIG. 4, and may also perform implementations described in related examples of the data processing apparatus provided by the examples of the present subject matter shown in FIG. 5A to FIG. 5B, which will not be described in detail herein.

In the several examples provided in the present subject matter, it is understood that the disclosed method, apparatus and system may be implemented in other ways. For example, the apparatus examples described above are merely illustrative. For example, the division of the unit is merely a logic function division, and there may be another division way in actual implementation. For example, a plurality of units or components may be combined or integrated into another system, or some features may be omitted or not performed. In another aspect, the couplings, direct couplings or communication connections shown or discussed with respect to each other may be indirect couplings or communication connections through some interface, apparatuses, or units, and may be electrical, mechanical, or otherwise.

The example of the present subject matter also provides a non-transitory computer-readable storage medium, storing a program instruction. The program, when executed, may include some or all steps of the blockchain-based data processing method in the corresponding examples of FIG. 2 or FIG. 4.

For simplicity of explanation, the various method examples described above are presented as a series of combinations of acts, but those skilled in the art will appreciate that the present subject matter is not limited by the order of acts described because some steps may occur in other orders or concurrently according to the present subject matter. Those skilled in the art will also appreciate that the acts and modules involved in the examples described in the specification are not necessarily required by the present subject matter.

Those skilled in the art can understand that all or part of the steps in the various methods of the above examples can be completed by instructing the relevant hardware by a program. The program may be stored in a non-transitory computer-readable storage medium, which includes: a flash drive, the ROM, the RAM, a disk, or an optical disk.

The examples of the present subject matter further provide a computer program product and a computer program, the computer program product or the computer program including a computer instruction stored in a non-transitory computer-readable storage medium. The processor of the server reads the computer instruction from the non-transitory computer-readable storage medium, and the processor executes the computer instruction to cause the server to perform the steps performed in the examples of the above methods.

The blockchain-based data processing method and apparatus, the device, and the medium provided by the examples of the present subject matter are described in detail, and the principles and implementations of the present subject matter are described herein by using specific examples. The above examples are merely used to help understand the method of the present subject matter and the core idea thereof. Meanwhile, it will be appreciated by those skilled in the art that changes may be made in the specific implementations and scope of application according to the thoughts of the present subject matter. In summary, the contents of the specification are not to be construed as limiting the present subject matter.

What is claimed is:

1. A blockchain-based data processing method, performed by a consensus node device in a blockchain network, the method comprising:

receiving block proposal information transmitted by an out-block node, wherein the block proposal information comprises a block constructed by the out-block node and a digital signature corresponding to the block, the block comprises block header information and block body information, the digital signature is obtained by performing digital signature processing only on the block header information without the block body information, and the block header information comprising a first Merkel root determined based on transaction data in the block body information;

acquiring the block header information and the digital signature from the block proposal information;

performing digest calculation on the block header information to obtain first digest information about the block header information;

performing de-signature processing on the digital signature to obtain second digest information about the block header information;

comparing only the first digest information and the second digest information and determining that the block header information is not tampered;

only when the first digest information and the second digest information are matched, acquiring the first Merkel root and the transaction data from the block proposal information, determining a second Merkel root based on the transaction data from the block proposal information, comparing the first Merkel root and the second Merkel root, and determining the block body information is not tampered when the first Merkel root and the second Merkel root match; and performing an operation on the block based on a comparison result of the first Merkel root and the second Merkel root.

2. The method according to claim 1, wherein the performing an operation on the block comprises: performing consensus processing on the block when the comparison result indicates that the first Merkel root and the second Merkel root are matched; and rejecting to process the block and transmitting feedback information to the out-block node when the comparison result indicates that the first Merkel root and the second Merkel root are not matched, wherein the feedback information is used for indicating that the transaction data in the block is tampered.

3. The method according to claim 2, further comprising:

receiving encrypted block proposal information transmitted by the out-block node when the comparison result indicates that the first Merkel root and the second Merkel root are not matched, wherein the encrypted block proposal information is obtained by the out-block node which verifies the transaction data in the block comprised in the block proposal information when a number of consensus nodes transmitting the feedback information meets a message retransmission condition and encrypts the block proposal information using node public keys of all the consensus nodes in the blockchain network when a verification result indicates that verification is passed;

decrypting the encrypted block proposal information using node private keys corresponding to the node public keys to obtain decrypted block proposal information; and verifying data comprised in the decrypted block proposal information and performing the operation on the block based on the verification result.

4. The method according to claim 1, wherein the block proposal information further comprises a node identification of the out-block node, and the method further comprises:

acquiring a node identification of a main node currently responsible for out-block and acquiring the node identification of the out-block node from the block proposal information; and performing an operation of the acquiring the block header information and the digital signature from the block proposal information and performing digest calculation on the block header information to obtain first digest information about the block header information when the node identification of the out-block node and the node identification of the main node are matched.

5. The method according to claim 1, wherein performing digest calculation comprises:

performing serialization processing on the block header information to obtain serialized data; and performing digest calculation on the serialized data to obtain the first digest information about the block header information.

6. A blockchain-based data processing method, performed by an out-block node device in a blockchain network, the method comprising:

creating a block comprising block header information and block body information, wherein the block body information comprises transaction data, and the block header information comprises a first Merkel root determined based on the transaction data;

performing digital signature processing only on the block header information without the block body information to obtain a digital signature; generating block proposal information based on the block and the digital signature;

transmitting the block proposal information to each consensus node in the blockchain network, wherein each consensus node in the blockchain network acquiring the block header information and the digital signature from the block proposal information;

performing digest calculation on the block header information to obtain first digest information about the block header information; performing de-signature processing on the digital signature to obtain second digest information about the block header information;

comparing only the first digest information and the second digest information and determining that the block header information is not tampered;

only when the first digest information and the second digest information are matched, acquiring the first Merkel root and the transaction data from the block proposal information, determining a second Merkel root based on the transaction data from the block proposal information, comparing the first Merkel root and the second Merkel root, and determining the block body information is not tampered when the first Merkel root and the second Merkel root match; and performing an operation on the block based on a comparison result of the first Merkel root and the second Merkel root.

7. The method according to claim 6, further comprising:

receiving feedback information returned by at least one consensus node in the blockchain network, wherein the feedback information is used for indicating that the transaction data in the block is tampered;

verifying the transaction data in the block comprised in the block proposal information when a number of consensus nodes returning the feedback information meets a message retransmission condition;

encrypting the block proposal information using node public keys of all the consensus nodes in the blockchain network when a verification result indicates that verification is passed to obtain encrypted block proposal information; and transmitting the encrypted block proposal information to each consensus node in the blockchain network.

8. The method according to claim 7, wherein the feedback information is transmitted when the at least one consensus node detects that the first Merkel root and the second Merkel root comprised in the block proposal information are not matched.

9. The method according to claim 6, wherein performing digital signature processing comprises:

performing serialization processing on the block header information to obtain serialized data;

performing digest calculation on the serialized data to obtain the second digest information about the block header information; and encrypting the second digest information using a signature private key to obtain the digital signature.

10. A blockchain-based data processing apparatus, comprising:

a data acquisition module configured to receive block proposal information transmitted by an out-block node, wherein the block proposal information comprises a block constructed by the out-block node and a digital signature corresponding to the block, the block comprises block header information and block body information, the digital signature is obtained by performing digital signature processing on the block header information, and the block header information comprising a first Merkel root determined based on transaction data in the block body information; and a processing module configured to:

acquire the block header information and the digital signature from the block proposal information, perform digest calculation only on the block header information without the block body information to obtain first digest information about the block header information;

perform de-signature processing on the digital signature to obtain second digest information about the block header information;

compare only the first digest information and the second digest information and determine that the block header information is not tampered;

only when the first digest information and the second digest information are matched, acquire the first Merkel root and the transaction data from the block proposal information, determine a second Merkel root based on the transaction data from the block proposal information, compare the first Merkel root and the second Merkel root, and determine the block body information is not tampered when the first Merkel root and the second Merkel root match; and perform an operation on the block based on a comparison result of the first Merkel root and the second Merkel root.

11. The apparatus according to claim 10, wherein the processing module is further configured to:

perform consensus processing on the block when the comparison result indicates that the first Merkel root and the second Merkel root are matched; and reject to process the block and transmit feedback information to the out-block node when the comparison result indicates that the first Merkel root and the second Merkel root are not matched, wherein the feedback information is used to indicate that the transaction data in the block is tampered.

12. The apparatus according to claim 10, wherein the processing module is further configured to:

perform serialization processing on the block header information to obtain serialized data; and perform digest calculation on the serialized data to obtain the first digest information about the block header information.

13. A blockchain-based data processing apparatus, comprising:

a data acquisition module configured to create a block, wherein the block comprises block header information and block body information, the block body information comprises transaction data, and the block header information comprising a first Merkel root determined based on the transaction data; and a processing module configured to:

perform digital signature processing only on the block header information without the block body information to obtain a digital signature;

generate block proposal information based on the block and the digital signature; and transmit the block proposal information to each consensus node in a blockchain network, wherein each consensus node in the blockchain network acquires the block header information and the digital signature from the block proposal information; perform digest calculation on the block header information to obtain first digest information about the block header information; perform de-signature processing on the digital signature to obtain second digest information about the block header information; compare only the first digest information and the second digest information and determine that the block header information is not tampered; only when the first digest information and the second digest information are matched, acquire the first Merkel root and the transaction data from the block proposal information, determine a second Merkel root based on the transaction data from the block proposal information, compare the first Merkel root and the second Merkel root, and determine the block body information is not tampered when the first Merkel root and the second Merkel root match; and perform an operation on the block based on a comparison result of the first Merkel root and the second Merkel root.

14. The apparatus according to claim 13, wherein the processing module is further configured to:

receive feedback information returned by at least one consensus node in the blockchain network, wherein the feedback information is used for indicating that the transaction data in the block is tampered;

verify the transaction data in the block comprised in the block proposal information when a number of consensus nodes returning the feedback information meets a message retransmission condition;

encrypt the block proposal information using node public keys of all the consensus nodes in the blockchain network when a verification result indicates that verification is passed to obtain encrypted block proposal information; and transmit the encrypted block proposal information to each consensus node in the blockchain network.

15. The apparatus according to claim 14, wherein the feedback information is transmitted when the at least one consensus node detects that the first Merkel root and the second Merkel root comprised in the block proposal information are not matched.

16. The apparatus according to claim 13, wherein the processing module is further configured to:

perform serialization processing on the block header information to obtain serialized data;

perform digest calculation on the serialized data to obtain the second digest information about the block header information; and encrypt the second digest information using a signature private key to obtain the digital signature.

17. A data processing device comprising:

a processor, a memory, and a network interface, wherein the memory is configured to store a computer program comprising a program instruction, and the processor is configured to call the program instruction to implement the blockchain-based data processing method according to claim 1.

18. A data processing device comprising:

a processor, a memory, and a network interface, wherein the memory is configured to store a computer program comprising a program instruction, and the processor is configured to call the program instruction to implement the blockchain-based data processing method according to claim 6.

19. A non-transitory computer-readable storage medium comprises:

a computer program comprising a program instruction which, when executed by a processor, causes a computer device having the processor to implement the blockchain-based data processing method according to claim 1.

20. A non-transitory computer-readable storage medium comprises:

a computer program comprising a program instruction which, when executed by a processor, causes a computer device having the processor to implement the blockchain-based data processing method according to claim 6.

* * * * *